(12) United States Patent
Baldemair et al.

(10) Patent No.: US 11,716,180 B2
(45) Date of Patent: *Aug. 1, 2023

(54) SELECTIVE SUPPRESSION OF UPLINK TRANSMISSION IN CONTROL REGIONS

(71) Applicant: Telefonaktiebolaget LM Ericsson (publ), Stockholm (SE)

(72) Inventors: Robert Baldemair, Solna (SE); Erik Dahlman, Stockholm (SE); Sorour Falahati, Stockholm (SE); Daniel Larsson, Lund (SE); Stefan Parkvall, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 120 days.

This patent is subject to a terminal disclaimer.

(21) Appl. No.: 17/337,800

(22) Filed: Jun. 3, 2021

(65) Prior Publication Data

US 2021/0297208 A1 Sep. 23, 2021

Related U.S. Application Data

(63) Continuation of application No. 16/698,351, filed on Nov. 27, 2019, now abandoned, which is a
(Continued)

(51) Int. Cl.
*H04L 5/00* (2006.01)
*H04W 72/0453* (2023.01)
(Continued)

(52) U.S. Cl.
CPC ............ *H04L 5/0039* (2013.01); *H04L 5/001* (2013.01); *H04L 5/0042* (2013.01);
(Continued)

(58) Field of Classification Search
None
See application file for complete search history.

(56) References Cited

U.S. PATENT DOCUMENTS

| 8,213,965 B2 | 7/2012 | Park et al. |
| 2010/0067472 A1 | 3/2010 | Ball et al. |

(Continued)

FOREIGN PATENT DOCUMENTS

| CN | 102870388 A | 1/2013 |
| CN | 103220796 A | 7/2013 |

(Continued)

OTHER PUBLICATIONS

Zhou, K. et al., "Dynamic Resource Allocation for Machine-Type Communications in LTE/LTE-A with Contention-Based Access", 2013 IEEE Wireless Communications and Networking Conference, Apr. 7-10, 2013, pp. 1-6.
(Continued)

*Primary Examiner* — Eunsook Choi
(74) *Attorney, Agent, or Firm* — Coats & Bennett, PLLC

(57) ABSTRACT

Limited uplink bandwidth radio network devices are supported on wide bandwidth uplink carriers by configuring and controlling the use of multiple control regions within the uplink carrier bandwidth. In some embodiments, the total bandwidth of the uplink carrier is divided into a plurality of sub-band portions, wherein each sub-band portion includes at least one control region nominally dedicated to the transmission of uplink control signaling. Radio network devices are configured with a specified portion of the uplink carrier bandwidth for use for uplink transmission, which includes at least one control region. Radio network devices may be provisioned or provided with information regarding control regions reserved for control signaling by other radio network devices. The radio network devices may be dynami-
(Continued)

cally configured to allow or suppress uplink data signaling in specified control regions, or portions thereof.

42 Claims, 19 Drawing Sheets

Related U.S. Application Data continuation of application No. 15/760,499, filed as application No. PCT/SE2017/051067 on Oct. 31, 2017, now Pat. No. 10,541,795.

(60) Provisional application No. 62/417,208, filed on Nov. 3, 2016.

(51) Int. Cl.
*H04W 72/21* (2023.01)
*H04W 72/04* (2023.01)

(52) U.S. Cl.
CPC .......... *H04L 5/0044* (2013.01); *H04L 5/0053* (2013.01); *H04L 5/0094* (2013.01); *H04W 72/0453* (2013.01); *H04W 72/21* (2023.01); *H04L 5/0005* (2013.01)

(56) References Cited

U.S. PATENT DOCUMENTS

| | | |
|---|---|---|
| 2010/0142467 A1 | 6/2010 | Tiirola et al. |
| 2012/0039252 A1 | 2/2012 | Damnjanovic et al. |
| 2013/0022019 A1 | 1/2013 | Han et al. |
| 2013/0044667 A1 | 2/2013 | Han et al. |
| 2013/0163556 A1* | 6/2013 | Lee ................ H04L 5/0053 370/336 |
| 2013/0294361 A1 | 11/2013 | Chen et al. |
| 2013/0322363 A1 | 12/2013 | Chen et al. |
| 2013/0322376 A1 | 12/2013 | Marinier et al. |
| 2013/0322397 A1 | 12/2013 | Lee et al. |
| 2014/0293843 A1 | 10/2014 | Papasakellariou et al. |
| 2015/0092645 A1 | 4/2015 | Tabet et al. |
| 2016/0338088 A1 | 11/2016 | Fakoorian et al. |
| 2016/0360550 A1 | 12/2016 | Chen et al. |
| 2017/0245265 A1* | 8/2017 | Hwang ................ H04W 4/70 |
| 2017/0310431 A1 | 10/2017 | Iyer et al. |
| 2017/0332359 A1 | 11/2017 | Tsai et al. |
| 2018/0131479 A1* | 5/2018 | Chen ................ H04L 5/001 |
| 2018/0220412 A1 | 8/2018 | Zhang et al. |
| 2019/0036753 A1 | 1/2019 | Wu et al. |
| 2019/0364558 A1* | 11/2019 | Kim ................ H04W 72/0453 |

FOREIGN PATENT DOCUMENTS

| | | |
|---|---|---|
| CN | 104380820 A | 2/2015 |
| CN | 105743627 A | 7/2016 |
| CN | 105850057 A | 8/2016 |
| CN | 105897390 A | 8/2016 |
| EP | 3214793 A2 | 9/2017 |
| WO | 2016048228 A1 | 3/2016 |
| WO | 2016068542 A2 | 5/2016 |
| WO | 2017081490 A1 | 5/2017 |

OTHER PUBLICATIONS

MTC, "Bulk Signaling Handling in MTC Congestion and Overload Control", Feb. 15, 2015, pp. 1-68 (English Abstract only).
Ipwireless Inc., "Low-cost MTC UE Study Item: Conclusions and Recommendations", 3GPP TSG RAN WG1 Meeting #69, May 21-25, 2012, pp. 1-3, Prague, Czech Republic, R1-122748.
Zte, "Detailed design on PUCCH for MTC enhancement", 3GPP TSG RAN WG1 Meeting #81, May 25-29, 2015, pp. 1-7, Fukuoka, Japan, R1-152958.
Interdigital, "On PUCCH for MTC UE", 3GPP TSG RAN WG1 Meeting #80bis, Apr. 20-24, 2015, pp. 1-6, Belgrade, Serbia, R1-152126.
Nokia Networks, "PUCCH Consideration for MTC", 3GPP TSG-RAN WG1 Meeting #80bis, Apr. 20-24, 2015, pp. 1-4, Belgrade, Serbia, R1-151310.
Mediatek Inc., "Discussion on narrow band PUCCH design for Rel-13 MTC", 3GPP TSG-RAN WG1 Meeting #81, Fukuoka, Japan, May 25, 2015, pp. 1-4, R1-153318, 3GPP.

* cited by examiner

SELECTIVE SUPPRESSION OF UPLINK TRANSMISSION IN CONTROL REGIONS

RELATED APPLICATIONS

The present application is a continuation of U.S. patent application Ser. No. 16/698,351, which was filed on Nov. 27, 2019, which was a continuation of U.S. patent application Ser. No. 15/760,499, which was filed on Mar. 15, 2018, which issued as U.S. Pat. No. 10,541,795 on Jan. 21, 2020, which was a national stage application of International Application No. PCT/SE2017/051067, which was filed Oct. 31, 2017, and claimed priority to U.S. Provisional Patent Application No. 62/417,208, which was filed Nov. 3, 2016. The disclosures of each of these applications are incorporated herein by reference in their entireties.

FIELD OF INVENTION

The present invention relates generally to wireless communication networks, and in particular to systems and method for enabling radio network devices having diverse uplink transmission bandwidths to utilize specified portions of an uplink carrier bandwidth.

BACKGROUND

Wireless communication networks, including network nodes and radio network devices such as cellphones and smartphones, are ubiquitous in many parts of the world. These networks continue to grow in capacity and sophistication. To accommodate both more users and a wider range of types of devices that may benefit from wireless communications, the technical standards governing the operation of wireless communication networks continue to evolve. The fourth generation (4G) of network standards has been deployed, and the fifth generation (5G, also known as New Radio, or NR) is in development.

5G is not yet fully defined, but in an advanced draft stage within the Third Generation Partnership Project (3GPP). 5G wireless access will be realized by the evolution of Long Term Evolution (LTE) for existing spectrum, in combination with new radio access technologies that primarily target new spectrum. Thus, it includes work on a 5G New Radio (NR) Access Technology, also known as next generation (NX). The NR air interface targets spectrum in the range from below 1 GHz up to 100 GHz, with initial deployments expected in frequency bands not utilized by LTE. Some LTE terminology may be used in this disclosure in a forward looking sense, to include equivalent 5G entities or functionalities, although a different term is or may eventually be specified in 5G. A general description of the agreements on 5G NR Access Technology so far is contained in 3GPP TR 38.802 V0.3.0 (2016-10), of which a draft version has been published as R1-1610848. Final specifications may be published inter alia in the future 3GPP TS 38.2** series.

FIG. 1 depicts the major radio access technology (RAT) nodes in both LTE and NR, as presently defined. The base station in NR will be called gNB, corresponding to the eNB in LTE. These entities may communicate over a link similar to the X2 interface. A NextGen core in NR corresponds to the Evolved Packet Core (EPC) of LTE.

In addition to expanded bandwidth and higher bitrates to enrich User Equipment (UE) experience, the 5G NR technology will include expanded support for machine-to-machine (M2M) or machine type communications (MTC), variously known as the Networked Society or Internet of Things (IoT). This support focuses on optimized network architecture and improved indoor coverage for a massive number of radio network devices with the following characteristics: low throughput (e.g., 2 kbps); low delay sensitivity (~10 seconds); ultra-low device cost (below 5 dollars); and low device power consumption (battery life of 10 years). As used herein, the term "radio network device" includes both UEs, such as cellphones and smartphones, and M2M/MTC/IoT type devices, which are often embedded in meters, appliances, vehicles, and the like, and are not directly controlled by users.

In all radio network device communication with the wireless network, uplink control signaling, also referred to as uplink L1/L2 control signaling, refers to time-critical signaling that is needed to convey control information from a radio network device to the network (i.e., in the uplink). Such control information may include, but is not limited to, Hybrid ARQ ACK/NACK feedback; channel quality information (CQI) including information that supports Multiple Antenna transmission and reception (MIMO); and Channel State Information (CSI), which can include information about the channel rank, often denoted with the term Rank Indication (RI). The control information may also include Scheduling Requests (SR) by which the mobile terminal can request transmission resources, e.g. triggered by user input, new data arriving to its transmission buffers, and the like.

In LTE, uplink control signaling is transmitted from a radio network device to the network either on the Physical Uplink Control Channel (PUCCH), or in case the control signaling is transmitted together with uplink data, multiplexed with the data on the Physical Uplink Shared Channel (PUSCH). Thus, the radio network device can transmit control signaling regardless of whether or not it has data to transmit simultaneously.

FIG. 2 depicts the LTE uplink control channel PUCCH. The PUCCH is arranged so that the physical resources that carry the PUCCH are at the upper and lower edges of the uplink carrier bandwidth. One benefit this arrangement is that all transmissions of data (e.g., PUSCH) of radio network devices can be arranged for transmission in contiguous spectrum simultaneously with radio network devices that transmit control signaling alone. Such PUSCH and PUCCH transmissions from different radio network devices are orthogonal in the sense they are transmitted on different time-frequency resources that do not interfere.

In particular, LTE configuration of PUCCH and PUSCH depicted in FIG. 2 also allows for configuring dedicated PUCCH resources to radio network devices, e.g., for periodic channel quality/state information, periodically occurring resources for scheduling requests, and the like.

In LTE, a radio network device does not use all PUCCH resources available on the carrier; rather, each radio network devices uses only a subset of PUCCH resources. In this manner, multiple radio network devices can send PUCCH control information to the network simultaneously. LTE therefore includes ways of subdividing the available resources of the control region for PUCCH, so many radio network devices can be allocated PUCCH resources within the same slot. For example, it is possible to configure radio network devices with dedicated PUCCH resources that occur periodically, e.g., for SR and CQI/CSI reporting. It can be anticipated that similar solutions, or at least solutions to achieve the same results, will be used in NR/5G.

Contiguous transmission can result in better Peak to Average Power Ratio (PAPR) and lower out-of-band emissions, as compared to non-contiguous transmissions—at least for the Discrete Fourier Transform Spread Orthogonal Frequency Division Multiplexing (DFTS-OFDM) used in the LTE uplink. As used herein, contiguous transmission means that the transmitter transmits on contiguous frequency bands, whereas non-contiguous means that a transmitter transmits on two or more frequency regions at the same time, with intervening frequency regions (e.g., guard bands in the case of carrier aggregation) where the transmitter does not transmit signaling (other than outskirts of the waveform).

As used herein, the term "control region" refers to spectrum within an uplink carrier nominally dedicated to uplink control signaling (although in some embodiments, data signaling may be allowed in control regions). PUCCH in LTE is one example of a control region. Non-contiguous data transmission could be necessary if a control region were to be placed at a central frequency region within the uplink carrier frequency. To avoid collision between radio network devices transmitting control signaling in the control region, and those radio network devices transmitting data, the data transmissions normally must not be allowed within the control region. This results in non-contiguous transmission for radio network devices transmitting data, if the devices utilize the full carrier bandwidth.

Having control regions (i.e., PUCCH) at the edges of the available uplink carrier bandwidth works well in LTE, where all radio network devices are required to support the full uplink carrier bandwidth. Having PUCCH at both edges also allows for frequency hopping between the regions, which provides frequency diversity gains, as illustrated by the shaded regions in FIG. 2. Since all radio network devices use the full transmission bandwidth, the control region is at the edges of the carrier for all radio network devices.

Since Release 10, LTE also supports carrier aggregation. With carrier aggregation, and particularly for uplink carrier aggregation, each aggregated uplink carrier has a structure similar to that described above, where control regions are placed at the edges of each carrier. Between each aggregated carrier, there is typically also a guard band for the purposes of aligning carriers on a carrier raster, and ensuring isolation between the uplink carriers—i.e., to ensure that transmitters on the different carriers do not interfere.

In the future, and particularly with the introduction of 5G/NR radio access technology, it is likely bandwidths will be defined even wider than the maximum 20 MHz carriers used in LTE. With bandwidths of, e.g., 40, 50, 100, 200 MHz, and even more than 1 GHz in high frequency spectra, there will be a need to support different types of radio network devices on the uplink carriers. In particular, there will be a need to support radio network devices that do not have the capability or need to transmit over the full uplink carrier bandwidth of, e.g., 100 MHz. A radio network device might have the capability of only transmitting over, e.g., 20 MHz, or the terminal might have the capability, but be currently configured to only transmit over 20 MHz. As another example, the network must support an anticipated explosion of narrowband radio network devices—for example, Narrowband Internet of Things (NB-IoT) utilizes the smallest allocable bandwidth unit in LTE: a Physical Resource Block (PRB), defined as 12 subcarriers by one slot (0.5 msec). With 15 KHz subcarrier spacing, NB-IoT radio network devices have a bandwidth of only 180 KHz. In these cases, the known solution from LTE, where the control regions are limited to the edges of wide uplink carrier bandwidth, are deficient.

Limiting at least some uplink carriers to smaller bandwidths, e.g., 5 MHz, will not alleviate the problem of radio network devices with still lower uplink bandwidth. For example, it is anticipated that many radio network device implementations will require low cost, and hence low maximum bit-rate, long battery life, and the like. Similar constraints (e.g., preserving battery life) may prompt radio network devices having higher capability to only transmit at a low bit-rate if that will satisfy current performance requirements.

FIG. 3 depicts one problem raised in supporting radio network devices utilizing less than a full uplink carrier bandwidth. Assume the uplink carrier bandwidth is 100 MHz, and a first radio network device transmits over the full 100 MHz. The first radio network device may transmit control signaling in the control regions at the carrier bandwidth edges, and (contiguous) data signaling throughout the remaining bandwidth. A second radio network device, however has only the capability, or is configured, to transmit over only a 20 MHz bandwidth. It is not possible to configure the second radio network device to utilize control regions at both edges of the 100 MHz carrier bandwidth. The second radio network device could use one of the control regions at either edge of the 100 MHz band if it would use one of the two corresponding sub-band portions of 20 MHz; however, the three 20 MHz sub-band portions in the middle of the 100 MHz carrier bandwidth would not be available for the narrower-bandwidth radio network devices, as these do not include any control region. This non-usability of much of the uplink carrier bandwidth, for radio network devices similar to the second one of FIG. 3, would severely limit the possibility of supporting both wide- and narrow-bandwidth radio network devices at the same time in the same network and/or in the same cells. It would also prevent the use of frequency hopping for narrower-bandwidth radio network devices between the control regions to achieve frequency diversity gains, as implemented and used in LTE.

Simply allocating control regions in the middle of the 100 MHz bandwidth presents a disadvantage to wide-bandwidth radio network devices, as it forces non-contiguous data transmission, which yields worse PAPR and out-of-band emissions.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to embodiments of the present invention described herein, at least some of the aforementioned deficiencies of the prior art are ameliorated by configuring and controlling the use of multiple control regions within an uplink carrier bandwidth. In some embodiments, the total bandwidth of the uplink carrier is divided into a plurality of sub-band portions, wherein each sub-band portion includes at least one control region nominally dedicated to the transmission of uplink control signaling. In some embodiments, the control region or regions are at one or both edges of the respective sub-band portion. In some embodiments, each sub-band portion has a control region at both edges of the sub-band portion. In some embodiments, two or more sub-band portions may share a control region. The sub-band portion bandwidth may be configured in accordance with the transmission bandwidth of currently configured radio network devices. Radio network devices that support and are configured to transmit over multiple sub-band portions, are configured with information concerning control regions that fall within configured/covered sub-band portions. The radio network devices are subsequently informed, e.g., by means of applicable signaling, whether the radio network device shall suppress transmitting data or any other information in the control regions, or whether the radio network devices is permitted and scheduled to transmit, e.g., data within or on the concerned control regions. In some embodiments, the applicable signaling may be realized with semi-static configuration, e.g., by RRC signaling. In some embodiments, the signaling by which a radio network device receives transmission suppression information for one or more control regions may be realized with dynamic scheduling, using downlink L1/L2 signaling, or MAC control signaling, such as MAC control elements.

One embodiment relates to a method, implemented by a radio network device operative in a wireless communication network, of transmitting uplink data and uplink control signaling to the network. Uplink data are transmitted over a specified portion of a full, continuous bandwidth of an uplink carrier. Uplink control signaling is transmitted in at least one control region within the specified portion. In some embodiments, the transmission of uplink data is suppressed in one or more control regions within the specified portion.

Another embodiment relates to a radio network device operative in a wireless communication network. The device includes one or more antennas and a transceiver operatively connected to the antennas. The device also includes processing circuitry operatively connected to the transceiver. The processing circuitry is operative to cause the transceiver to transmit uplink data over a specified portion of a full, continuous bandwidth of an uplink carrier; and transmit uplink control signaling in at least one control region within the specified portion. In some embodiments, the processing circuitry is further operative to suppress the transmission of uplink data in one or more control regions within the specified portion.

Yet another embodiment relates to an apparatus operative in a wireless communication network. The apparatus includes a first module operative to transmit uplink data over a specified portion of a full, continuous bandwidth of an uplink carrier. The apparatus also includes a second module operative to transmit uplink control signaling in at least one control region within the specified portion. The apparatus optionally further includes a third module operative to suppress the transmission of uplink data in one or more control regions within the specified portion.

Still another embodiment relates to a computer program comprising instructions which, when executed by processing circuitry of a radio network device operative in a wireless communication network, causes the device to carry out the method of transmitting uplink data and uplink control signaling to the network described above. Another embodiment relates to a carrier containing the computer program, wherein the carrier is one of an electronic signal, optical signal, radio signal, or computer readable storage medium.

One embodiment relates to a method, implemented by a radio network node operative in a wireless communication network, of receiving uplink data and uplink control signaling from a radio network device. Uplink data are received from a radio network device over a specified portion of a full, continuous bandwidth of an uplink carrier. Uplink control signaling is received from the radio network device in at least one control region within the specified portion.

Another embodiment relates to a radio network node operative in a wireless communication network. The device includes one or more antennas and a transceiver operatively connected to the antennas. The device also includes processing circuitry operatively connected to the transceiver. The processing circuitry is operative to cause the transceiver to receive uplink data from a radio network device over a specified portion of a full, continuous bandwidth of an uplink carrier; and receive uplink control signaling from the radio network device in at least one control region within the specified portion.

Yet another embodiment relates to an apparatus operative in a wireless communication network. The apparatus includes a first module operative to receive uplink data from a radio network device over a specified portion of a full, continuous bandwidth of an uplink carrier. The apparatus also includes a second module operative to receive uplink control signaling from the radio network device in at least one control region within the specified portion.

Still another embodiment relates to a computer program comprising instructions which, when executed by processing circuitry of a radio network node operative in a wireless communication network, causes the device to carry out the method of receiving uplink data and uplink control signaling from a radio network device described above. Another embodiment relates to a carrier containing the computer program, wherein the carrier is one of an electronic signal, optical signal, radio signal, or computer readable storage medium.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

The full, continuous bandwidth of an uplink carrier may be logically divided into two or more segments, referred to herein as "sub-band portions." Each sub-band portion includes at least one control region. As used herein, a "control region" is a segment of bandwidth of an uplink carrier nominally allocated to the transmission of uplink control signaling. In various embodiments, the allocation of a control region to uplink control signaling may be absolute (i.e., no data signaling transmission is allowed), or both uplink data and uplink control signaling may be transmitted in a control region.

According to embodiments of the present invention, a radio network device may be configured to transmit over a specified portion of the full, continuous bandwidth of an uplink carrier. Each radio network device may be capable, or be configured, to transmit over a different specified portion. Each specified portion includes a control region for the transmission of uplink control signaling. In some embodiments, a specified portion comprises one or more sub-band portion of the carrier bandwidth. However, in other embodiments, a specified portion for a radio network device may span only part of one or more sub-bands.

Figure 1:
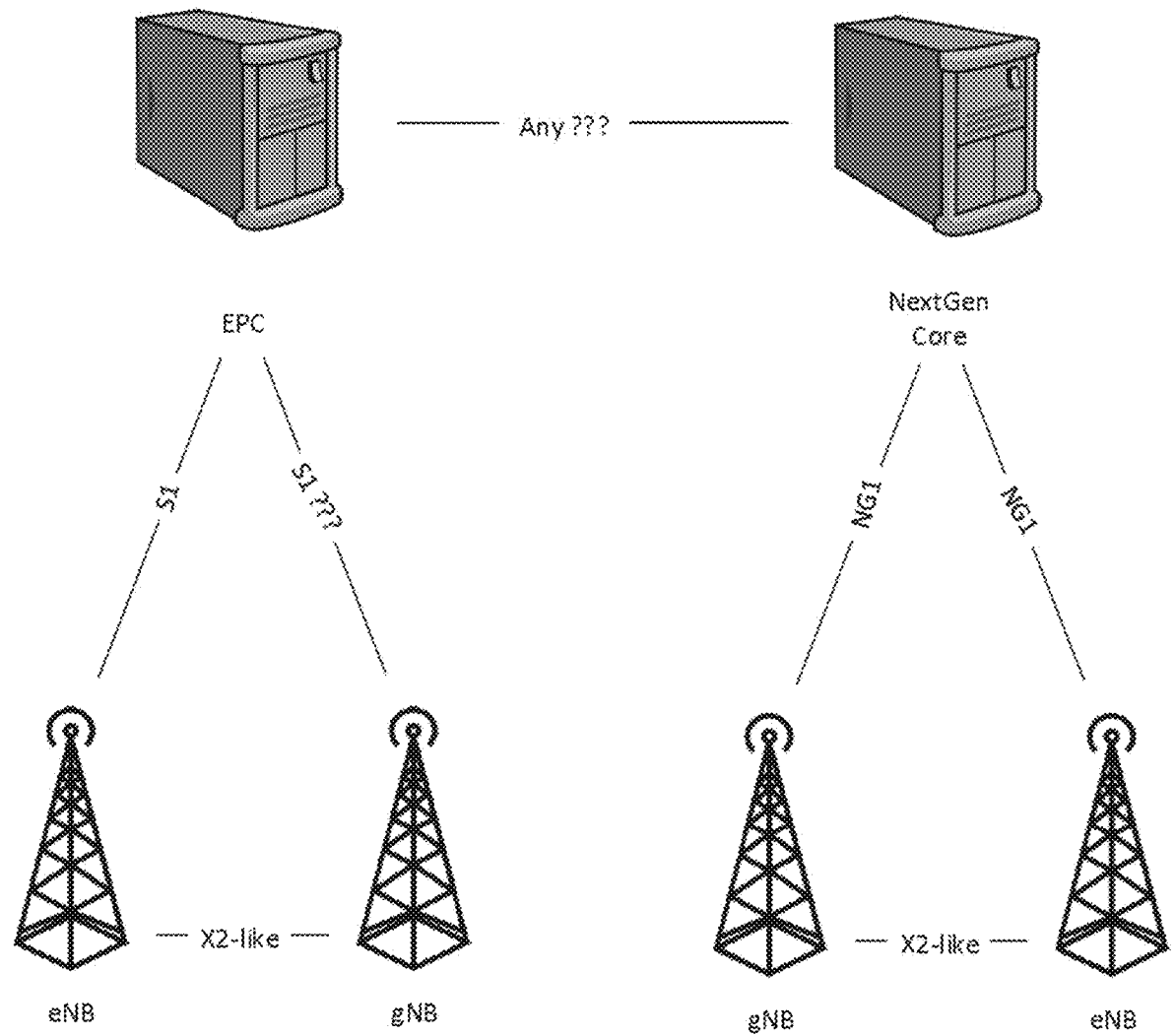
FIG. 1 is a block diagram of LTE and NR radio access technology and network nodes.
Figure 2:
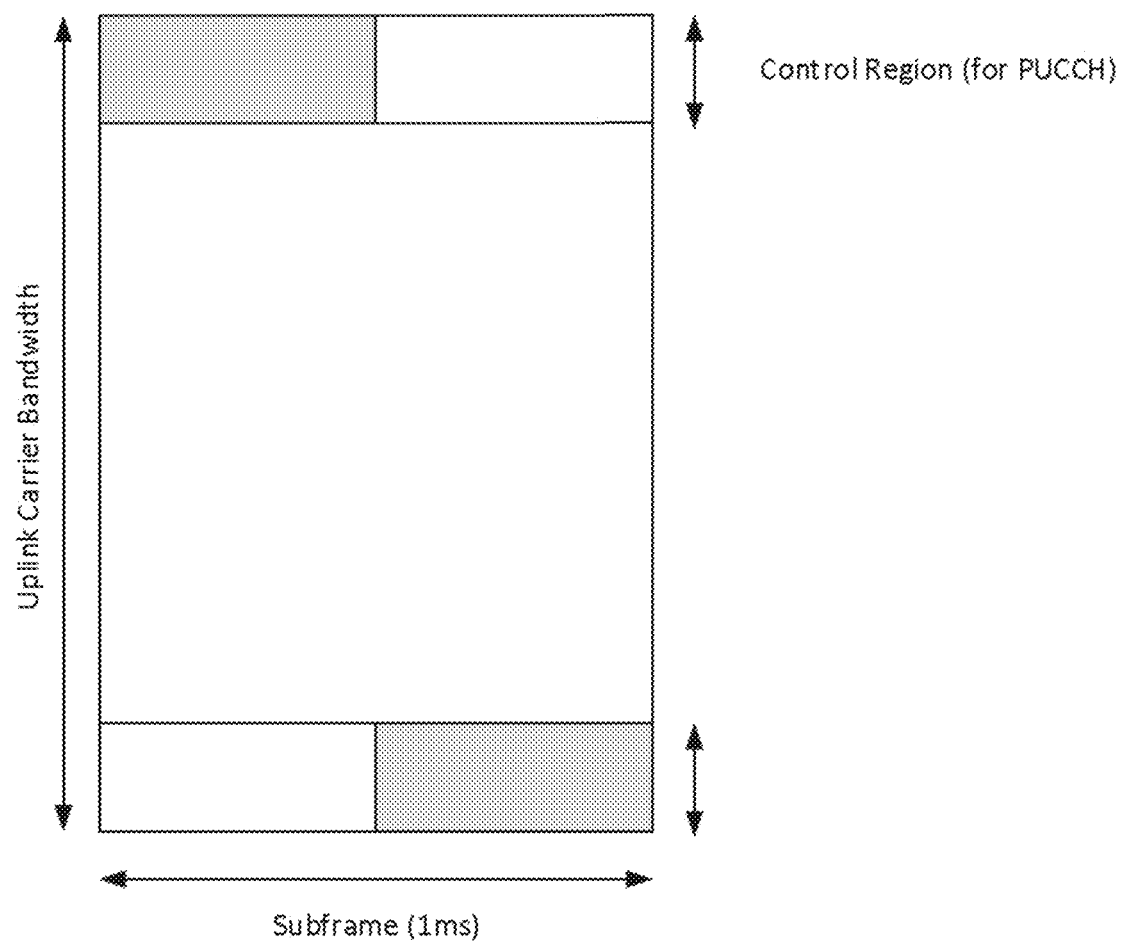
FIG. 2 is a spectrum diagram of a prior art LTE uplink carrier.
Figure 3:
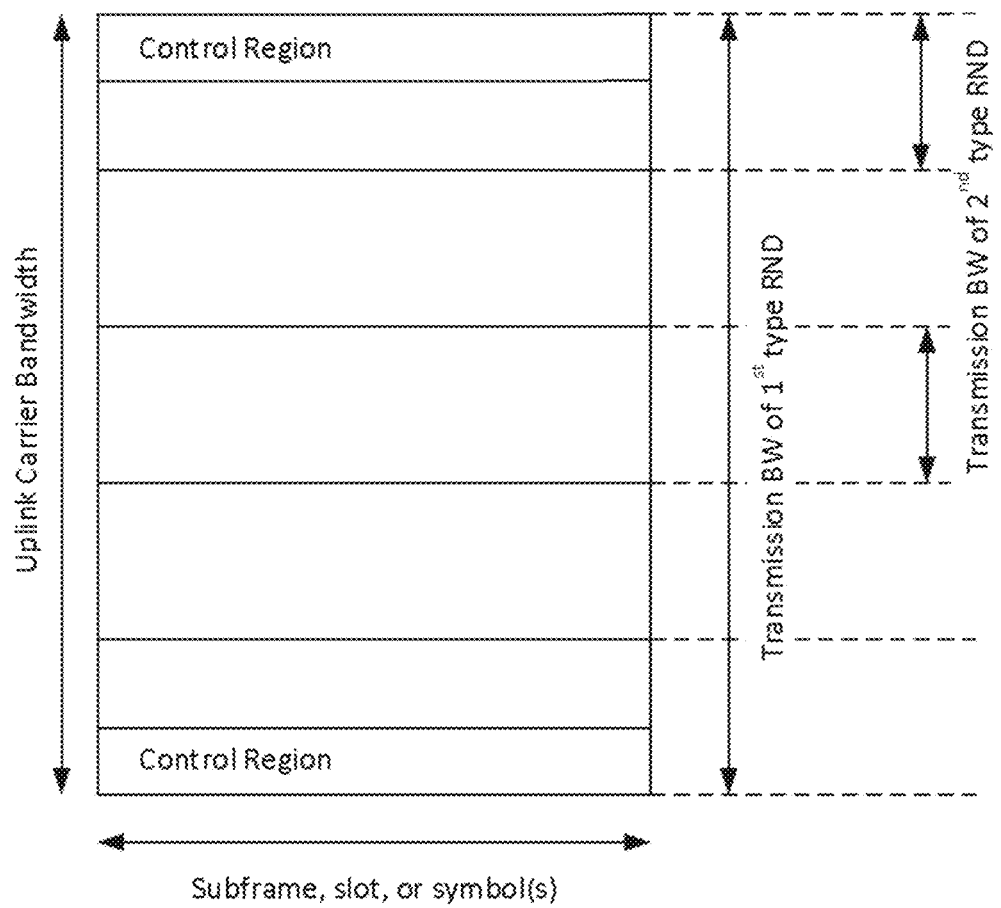
FIG. 3 is a spectrum diagram of a wideband uplink carrier divided into sub-band portions.
Figure 4:
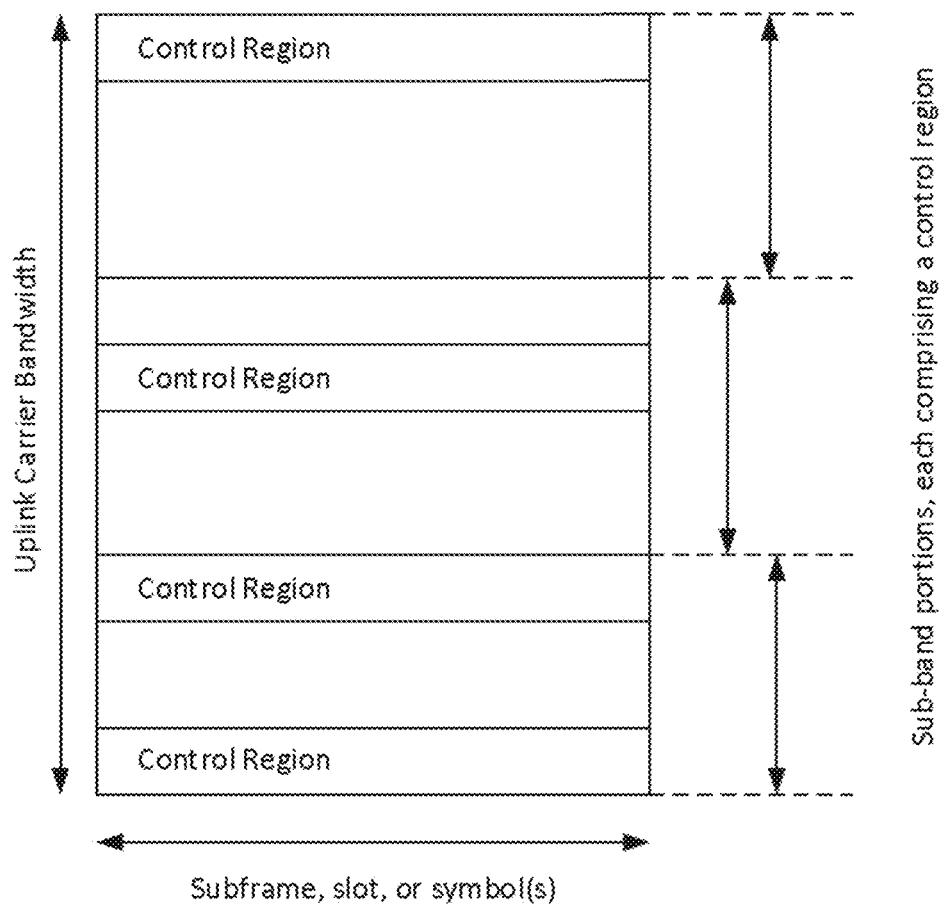
FIG. 4 is a spectrum diagram of a wideband uplink carrier divided into sub-band portions with a control region in each sub-band portion.

FIG. 4 depicts the bandwidth of an uplink carrier divided into sub-band portions. Each sub-band portion includes a control region. Division of an uplink carrier bandwidth into sub-band portions is performed by the network, and communicated to radio network devices. In one embodiment, the carrier identification and sub-band portion information is transmitted in System Information by a base station (gNB). In one embodiment, the sub-band portion information comprises the number of sub-band portions, wherein the sub-band portions are equal, as depicted in FIG. 4. However, this is not a limitation of embodiments of the present invention, and in other embodiments the sub-band portions may be of unequal size. An uplink carrier bandwidth may be divided into any number of sub-band portions.

The upper and lower sub-band portions depicted in FIG. 4 include a control region at the upper edge, and at both the upper and lower edge of the sub-band portions, respectively. The middle sub-band portion in FIG. 4 includes a control region that is not located at an edge of the sub-band portion. In general, a control region may appear anywhere within a sub-band portion. Regardless of the location of a control region, uplink control signaling is transmitted over a control channel, e.g. PUCCH in LTE, where the PUCCH is carried using the physical resources of the control region(s). Note that NR or other future wireless communication network specifications may use a different designation than PUCCH for the uplink control channel.

Figure 5:
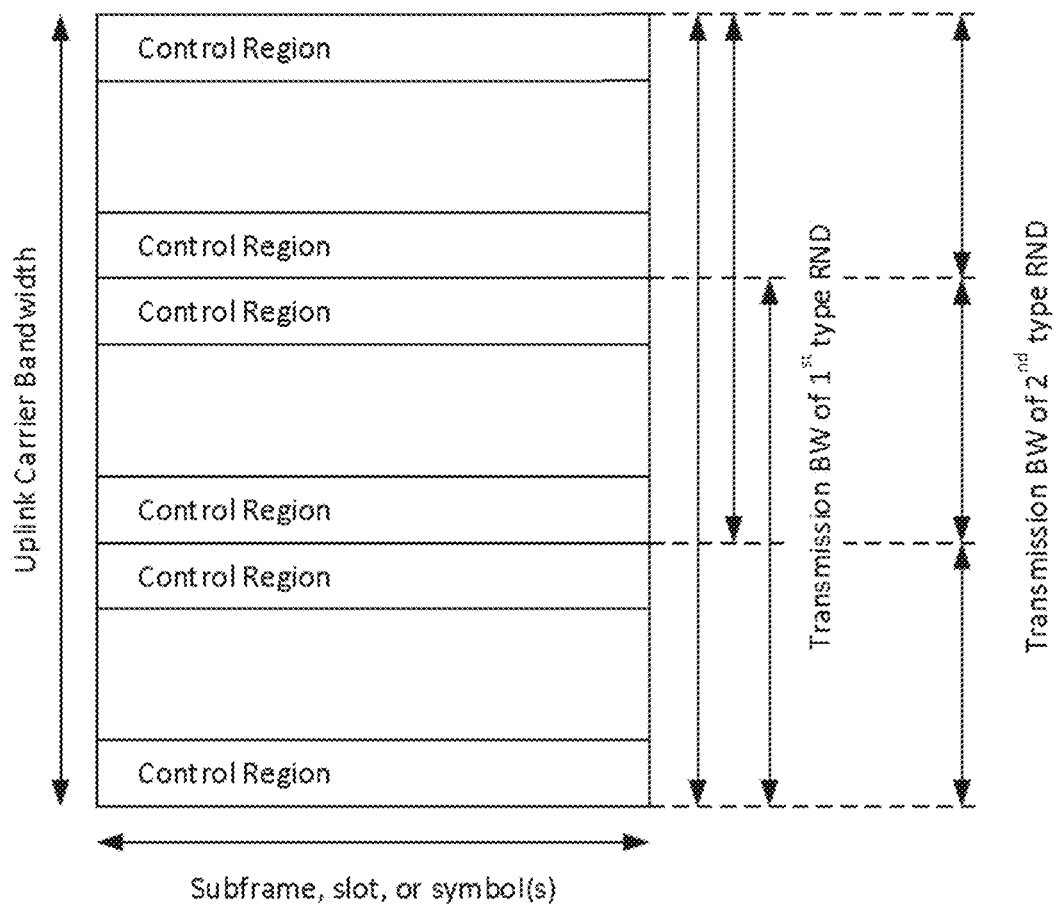
FIG. 5 is a spectrum diagram of a wideband uplink carrier divided into sub-band portions with a control region at each edge of each sub-band portion.

In one embodiment, the specified portion of the full, continuous bandwidth of an uplink carrier utilized by a radio network device (either due to its capability or due to being configured as such) is an integral number of sub-band portions. FIG. 5 depicts an uplink carrier bandwidth divided into three, equal-size sub-band portions, each with a control region at both the upper and lower edge. A first type of radio network device, capable of a relatively wide uplink bandwidth, may be configured such that its specified portion of the uplink carrier bandwidth spans two or even all three of the sub-band portions. A second type of radio network device, capable of or configured to use only a relatively narrow uplink bandwidth, may be configured such that its specified portion of the uplink carrier bandwidth is limited to one sub-band portion. In the embodiment depicted in FIG. 5, each sub-band portion includes a control region at both the upper and lower edge. This allows contiguous transmission for the second type of radio network devices, and also allows for frequency diversity in the uplink control channel.

Figure 6:
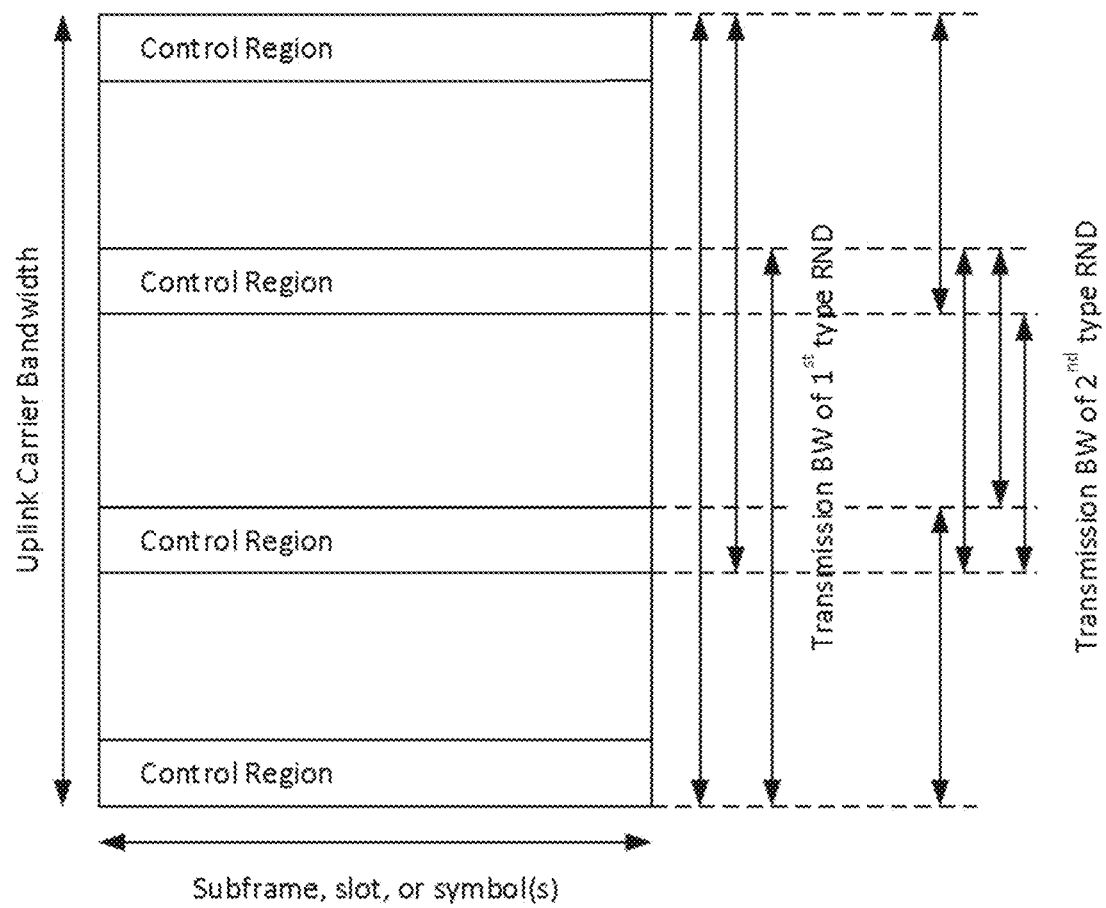
FIG. 6 is a spectrum diagram of a wideband uplink carrier divided into sub-band portions with shared control regions between sub-band portions.

FIG. 6 depicts an embodiment in which control regions are located throughout the uplink carrier bandwidth, and in which the specified portion of the uplink carrier bandwidth for each radio network device may be defined such that the control regions are shared, also referred to as control region pooling. These embodiments are possible since there are no guard-bands between the sub-band portions, in contrast to the known carrier-aggregation solution implemented in LTE Release 10. FIG. 6 depicts various specified portions defined for a first, wide-bandwidth type radio network device, each of which is defined so as to include a control region at both the upper and lower edge. FIG. 6 also depicts various specified portions defined for a second, narrower-bandwidth type radio network device. These specified portions may include two control regions, located at both the upper and lower edge of the specified portion, as indicated by the three left-most arrows labeled second type. Additionally, FIG. 6 depicts, in the two right-most arrows of the second type, embodiments in which the specified portion of the uplink carrier bandwidth includes only one control region. This reduces the transmission bandwidth of the radio network device. However, it also reduces the possibility for frequency diversity, e.g., through hopping techniques between the control regions.

Radio network devices can thus be configured to use any of the sub-band portions within the uplink carrier bandwidth, and the radio network devices can be configured with control channel resources within the sub-bands. For example, some periodically occurring control channel resources could be configured to radio network devices, for e.g., SR or CQI/CSI purposes. In all embodiments, the radio network devices may be configured with a specified portion of the uplink carrier bandwidth by higher-layer signaling, such as Radio Resource Control (RRC) signaling (or its 5G equivalent). In this manner, both the radio network device and the base station (gNB) have the same understanding of where the UE will transmit its signals.

Figure 7:
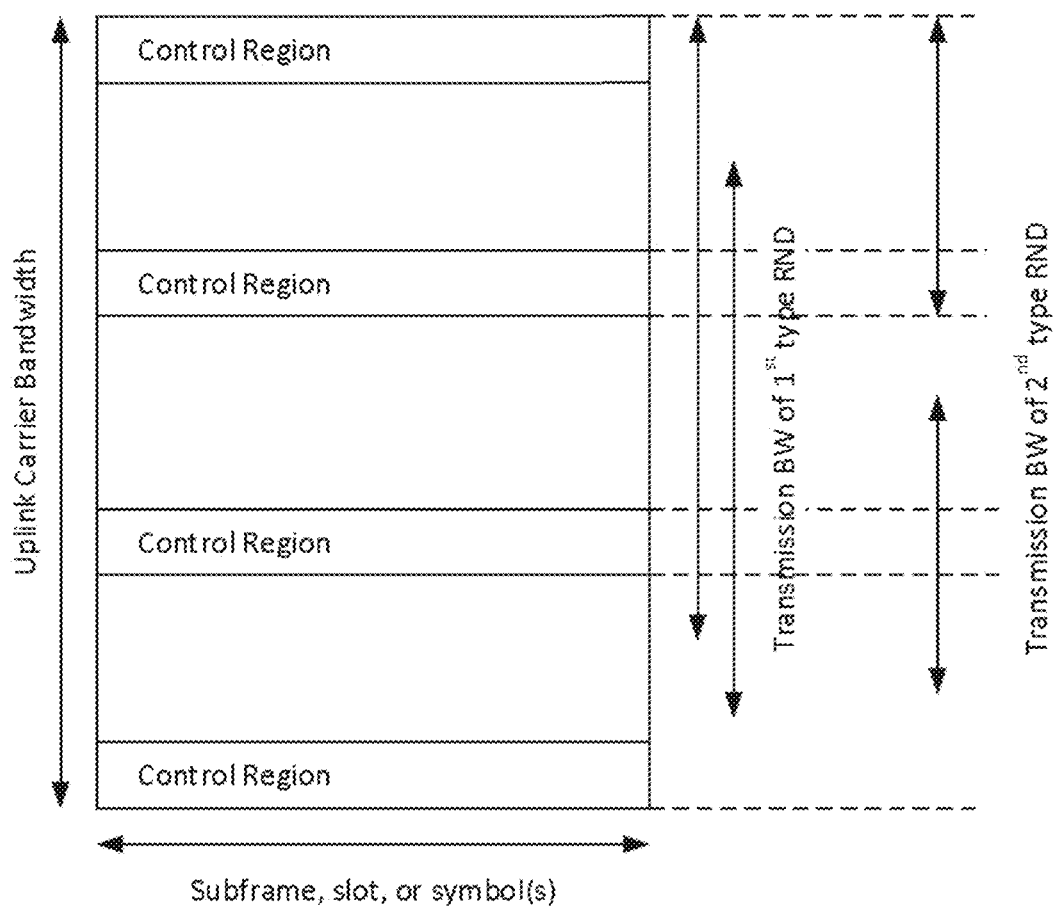
FIG. 7 is a spectrum diagram of a wideband uplink carrier depicting specified portions of bandwidth for various radio network devices that do not necessarily correspond to sub-band portion boundaries.

In all the embodiments described above, the specified portions of uplink carrier bandwidth comprise an integral number of sub-bands portions (with possible control region pooling, as in FIG. 6). However, the invention is not so limited. FIG. 7 depicts embodiments in which the specified portions of uplink carrier bandwidth for radio network devices do not necessarily coincide with sub-band portion boundaries (the sub-band portions in FIG. 7 share control regions). For example a first, wideband type of radio network device may have a specified portion covering the upper two sub-band portions and part of the lower sub-band portion, or may include the center sub-band portion and only parts of both the upper and lower sub-band portion. A second, narrowband type of radio network device may have a specified portion comprising the upper sub-band, or may comprise only portions of the two lower sub-band portions, and their shared control region. This latter embodiment is less preferable from a frequency-diversity perspective, but may be necessary to accommodate the uplink transmission capabilities of a particular radio network device.

Figure 8:
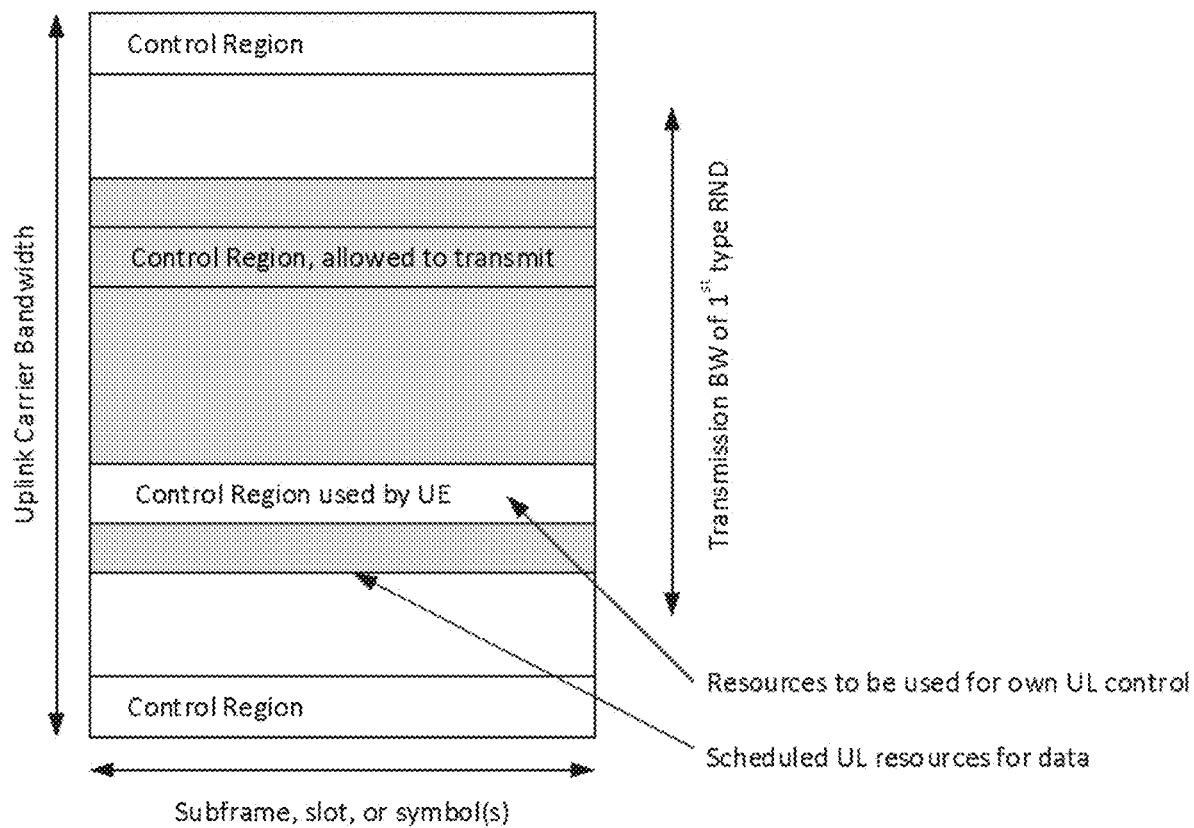
FIG. 8 is a spectrum diagram of a wideband uplink carrier depicting control region resources subtracted from scheduled UL data transmission resources.

FIG. 8 depicts an embodiment in which resources scheduled for data transmission cross a control region, the resources of which the radio network device must reserve to uplink control signaling. In this case, the resources of the control region (which may comprise the entire defined control region, or only part of it) are subtracted from the portion of uplink bandwidth specified for use by the radio network device, yielding a reduced portion of the uplink carrier bandwidth in which the radio network device may transmit data. Uplink data is then transmitted over this reduced portion.

In some embodiments, particularly with wider-bandwidth radio network devices, whose specified portion of the uplink carrier bandwidth may span multiple sub-band portions, and hence a plurality of control regions, it may be advantageous in some cases, e.g., for interference suppression, to prevent the radio network devices from transmitting data in the control regions. In other cases, the radio network devices may be allowed to utilize one or more of the control regions for data signaling, providing a more contiguous spectrum (this is depicted in the upper control region of FIG. 8, wherein data is allowed to be transmitted in a nominal control region). The control information for selectively suppressing the transmission of data signaling in control regions can be conveyed to the radio network device using dynamic scheduling, or by use of higher-layer signaling.

For example, a radio network device may be semi-statically configured with information about the presence and location of control regions using higher-layer signaling, and whenever the network finds it appropriate, the radio network device may be dynamically controlled to suppress transmissions in one or more control regions. For example, the dynamic control could be implemented using a downlink physical control channel carrying an assignment message that includes information whether the radio network device shall transmit or shall not transmit in a control region already configured by higher layer signaling. The assignment message could be carried on a Physical Downlink Control Channel (PDCCH) using Downlink Control Information (DCI), or the functionally equivalent signaling in 5G/NR. The granularity of such directive could be per control region, per group of control regions (with the grouping being previously semi-statically configured), or by one flag (e.g., one bit) for all configured control regions. In one embodiment, particularly applicable where a control region spans many resource blocks, the control region may be divided into two or more sub-control-regions. The transmission suppression directive may in this case be on a fractional control region granularity, whereby a separate "muting" indication is provided for each sub-control-region.

In one embodiment, the higher-layer signaling of control regions is omitted, and the radio network device used hard-coded or provisioned parameters to identify the control regions. In one embodiment, the control regions may occur at intervals and locations that are dependent on the carrier bandwidth, for example using a predetermined relationship. As discussed above, the carrier bandwidth and the sub-band portions could also be signaled using System Information. In one embodiment, the full bandwidth may be reported together with a parameter that identifies the number of sub-band portions. In one embodiment, the sub-band portions are then of equal bandwidth, based on the parameter or parameters.

Those of skill in the art will understand that a base station (gNB) must know the type of radio network device that is in the need of uplink transmission resources, to be able to provision it with a specified portion of an uplink carrier bandwidth in which to transmit. In one embodiment, the radio network device transmits, and the base station receives, information about the radio network device capability for transmitting over one or multiple sub-band portions, or more generally its uplink transmission bandwidth capability and configuration. The capability/configuration information transmitted from the radio network device to the base station may also include information about whether the radio network device can support muting in control regions. The base station then configures the radio network device accordingly.

Figure 9:
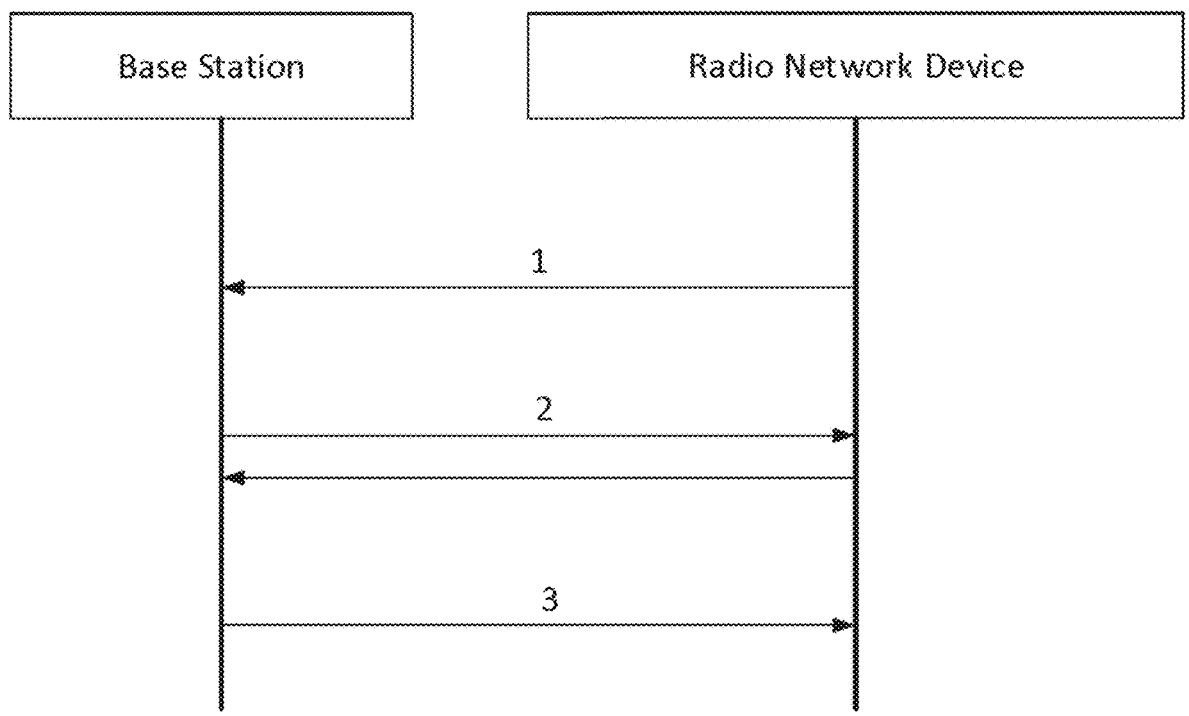
FIG. 9 is a signaling diagram.

FIG. 9 depicts one non-limiting example of signaling between a radio network device and the network to achieve specified portion of uplink carrier bandwidth configuration. First (signal 1), a radio network device sends its capability information to the base station. In embodiments in which the radio network device has previously provided the network with capability information, this step can be omitted.

Second (signal 2), based on the radio network device capability and also potentially based on other factors, such as network load and service requirements of the radio network device, the base station initiates a configuration of the radio network device. The configuration may include information about carrier bandwidth and sub-band partitioning of the carrier. The configuration may also include information about control regions. The radio network device is also configured with its specified portion of the uplink carrier bandwidth, which may or may not exactly coincide with one or multiple sub-band portions. In one embodiment, the radio network device is not made aware of any information about the carrier bandwidth, only about the sub-band portions and its specified portion. The configuration of the radio network device may be performed with higher layer signaling, such as the RRC protocol. The radio network device may send a message back to the base station, in which it confirms that the reception of the configuration message was successful.

Third (signal 3), after the radio network device is aware of its specified portion, as well as the sub-band portions which overlap with its specified portion (either fully or partly), and control regions within is specified portion, the radio network device receives a scheduling command, telling the radio network device to transmit uplink data over its specified portion of the uplink carrier bandwidth, and uplink control signaling in one or more control regions within the specified portion. In one embodiment, the scheduling command includes information informing the radio network device whether it should mute its data transmission over one or more control regions within its specified region, or if it is allowed to transmit data over the respective control region.

Figure 10:
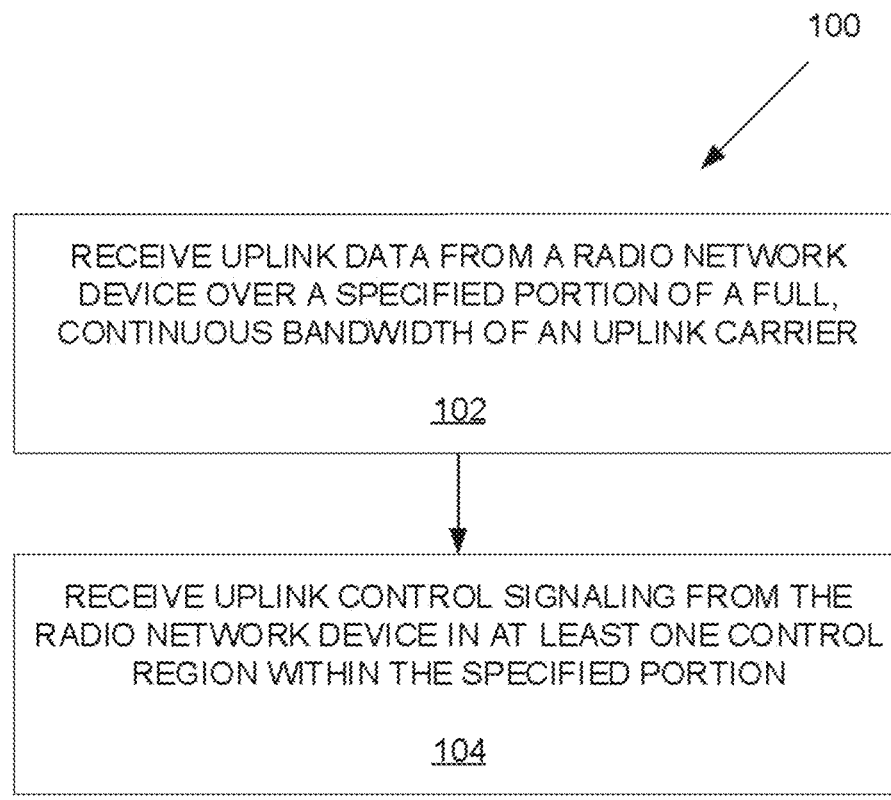
FIG. 10 is a flow diagram of a method, implemented by a radio network node, of receiving uplink data and uplink control signaling from a radio network device.

FIG. 10 depicts a flow diagram of a method 100, implemented by a radio network node operative in a wireless communication network, of receiving uplink data and uplink control signaling from a radio network device. The radio network node receives uplink data from a radio network device over a specified portion of a full, continuous bandwidth of an uplink carrier (block 102). The radio network node receives uplink control signaling from the radio network device in at least one control region within the specified portion (block 104).

Figure 11:
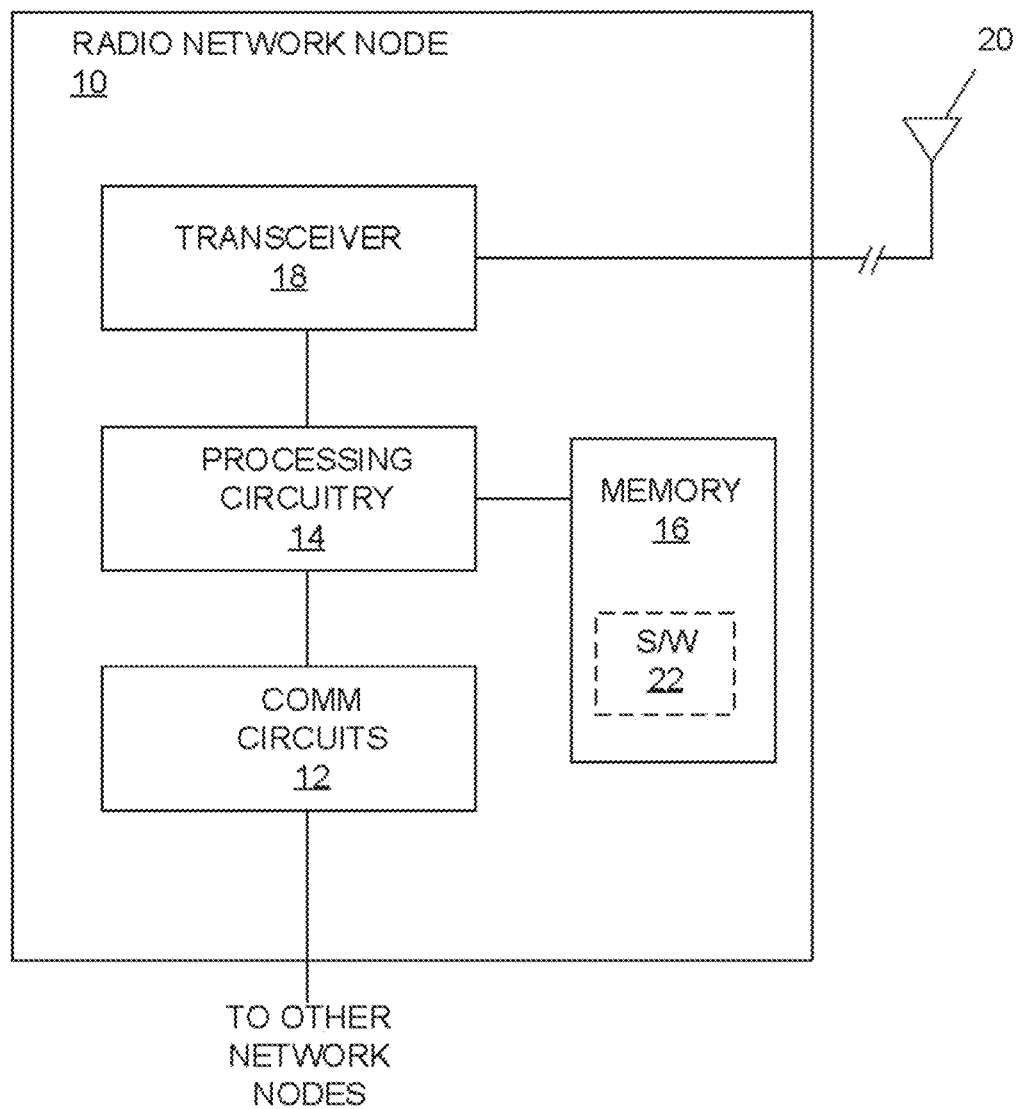
FIG. 11 is a block diagram of a radio network node, such as a base station.

FIG. 11 depicts a radio network node 10 operative in a wireless communication network. The radio network node 10 includes communication circuits 12 operative to exchange data with other network nodes; processing circuitry 14; memory 16; and radio circuits, such as a transceiver 18, one or more antennas 20, and the like, to effect wireless communication across an air interface to one or more radio network devices. As indicated by the broken connection to the antenna(s) 20, the antenna(s) may be physically located separately from the radio network node 10, such as mounted on a tower, building, or the like. Although the memory 16 is depicted as being separate from the processing circuitry 14, those of skill in the art understand that the processing circuitry 14 includes internal memory, such as a cache memory or register file. Those of skill in the art additionally understand that virtualization techniques allow some functions nominally executed by the processing circuitry 14 to actually be executed by other hardware, perhaps remotely located (e.g., in the so-called "cloud"). In one embodiment, the radio network node 10 is a base station, known as eNB in LTE or gNB in NR.

According to embodiments of the present invention, the memory 16 is operative to store, and the processing circuitry 14 is operative to execute, software 22 which when executed is operative to cause the radio network node 10 to receive uplink data from a radio network device over a specified portion of a full, continuous bandwidth of an uplink carrier, and to receive uplink control signaling from the radio network device in at least one control region within the specified portion, as described and claimed herein. This allows the radio network node 10 to utilize very wide bandwidth uplink carriers, and efficiently support radio network devices having very different uplink bandwidth capabilities or configurations.

Figure 12:
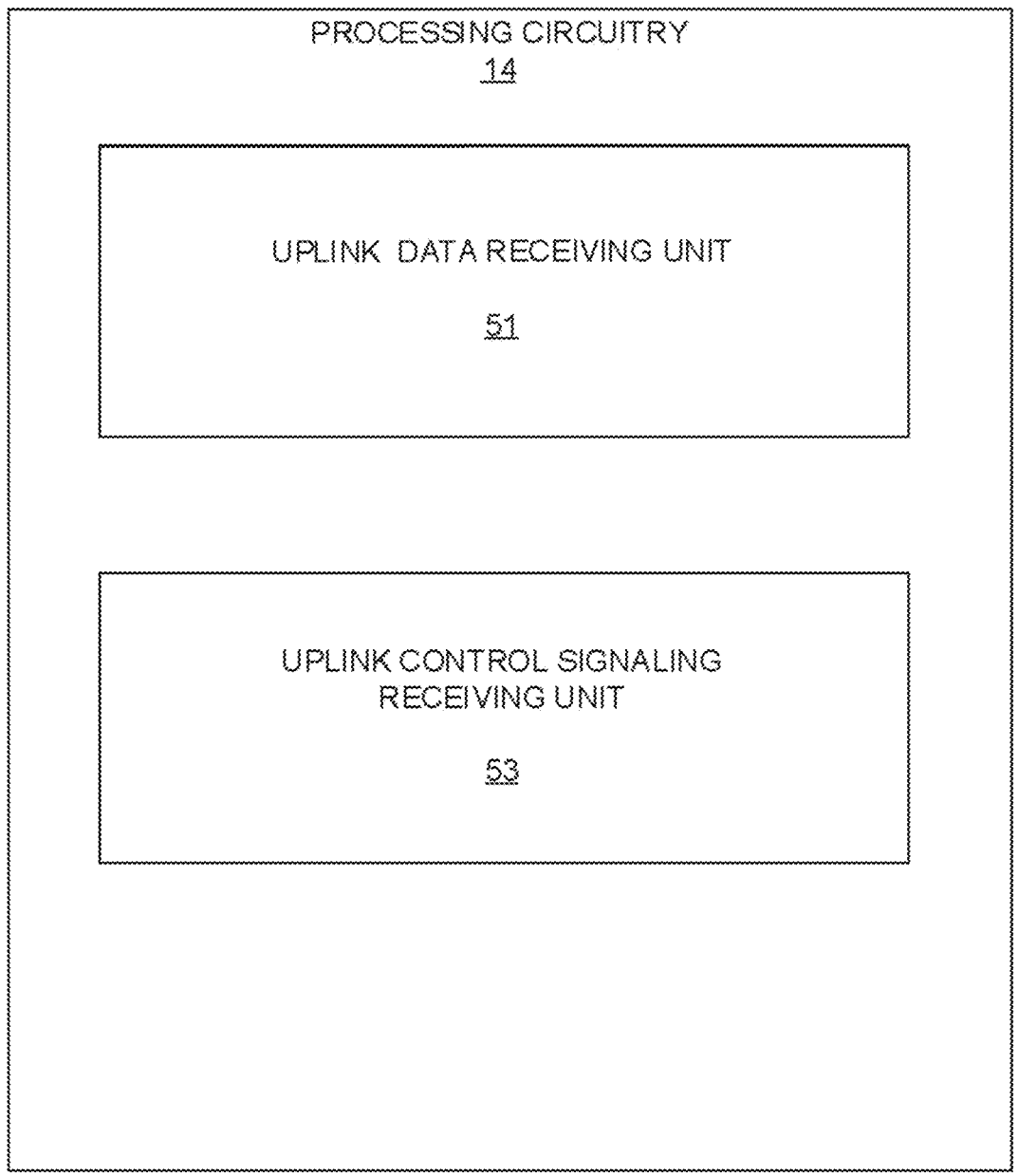
FIG. 12 is a diagram of physical units in processing circuitry in the network radio node of FIG. 11.

FIG. 12 illustrates example processing circuitry 14, such as that in the radio network node 10 of FIG. 11. The processing circuitry 14 comprises a plurality of physical units. In particular, the processing circuitry 14 comprises an uplink data receiving unit 51, and an uplink control signaling receiving unit 53. The uplink data receiving unit 51 is configured to receive uplink data from a radio network device over a specified portion of a full, continuous bandwidth of an uplink carrier. The uplink control signaling receiving unit 53 is configured to receive uplink control signaling from the radio network device in at least one control region within the specified portion.

Figure 13:
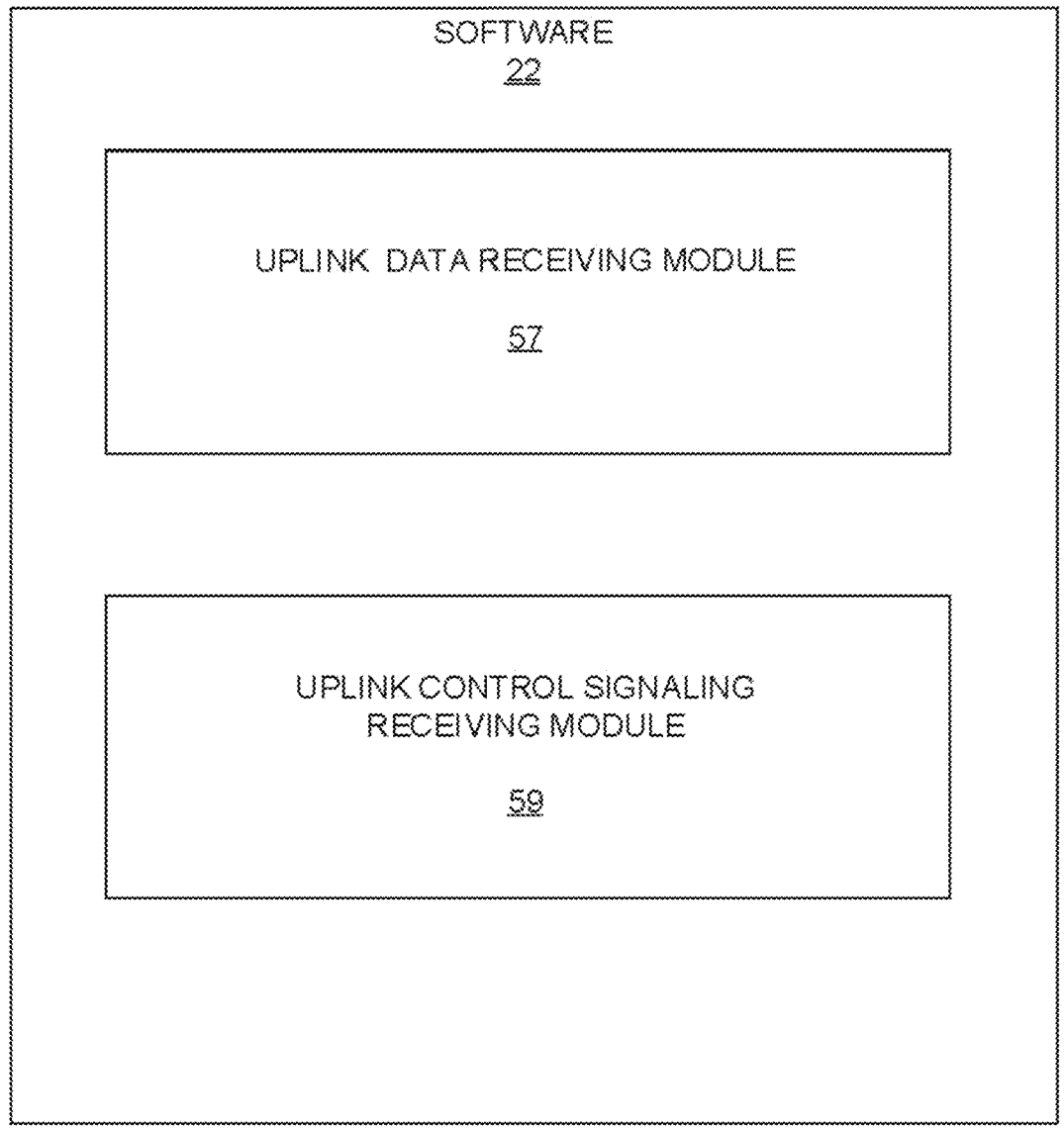
FIG. 13 is a diagram of software modules in memory in the network radio node of FIG. 11.

FIG. 13 illustrates example software 22, such as that depicted in the memory 16 of the radio network node 10 of FIG. 11. The software 22 comprises a plurality of software modules. In particular, the software 22 comprises an uplink data receiving module 57, and an uplink control signaling receiving module 59. The uplink data receiving module 57 is configured to receive uplink data from a radio network device over a specified portion of a full, continuous bandwidth of an uplink carrier. The uplink control signaling receiving module 59 is configured to receive uplink control signaling from the radio network device in at least one control region within the specified portion.

Figure 14:
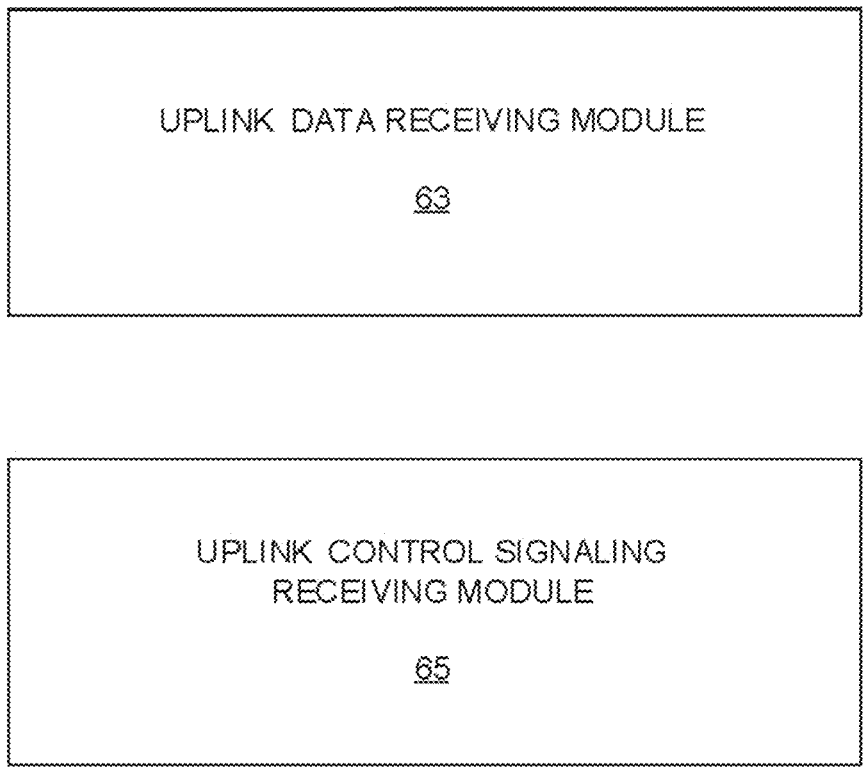
FIG. 14 is a diagram of modules comprising a virtual function module architecture of a radio network node apparatus.

FIG. 14 illustrates a plurality of modules comprising a virtual function module architecture of an apparatus operative as a radio network node in a wireless communication network. A first module 63 is configured to receive uplink data from a radio network device over a specified portion of a full, continuous bandwidth of an uplink carrier. A second module 65 is configured to receive uplink control signaling from the radio network device in at least one control region within the specified portion.

Figure 15:
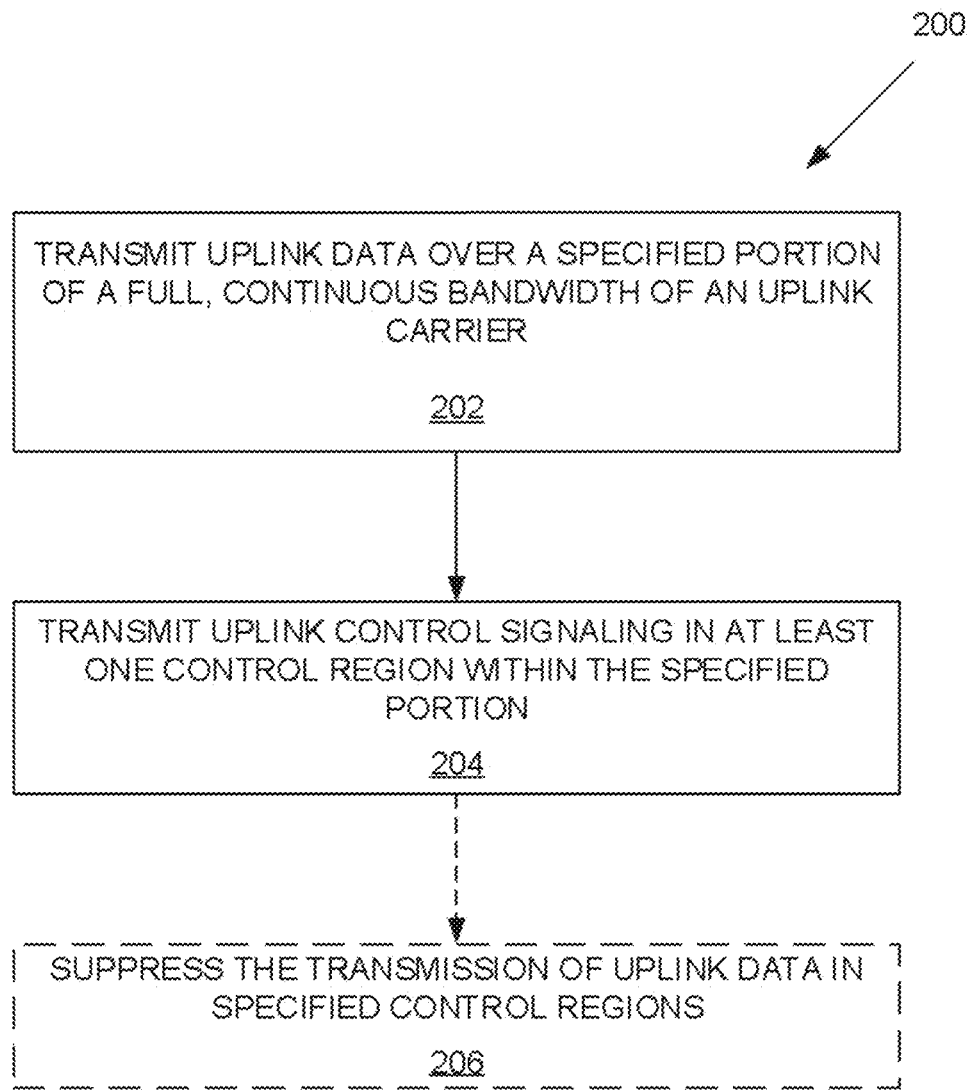
FIG. 15 is a flow diagram of a method, implemented by a radio network device, of transmitting uplink data and uplink control signaling to the network.

FIG. 15 depicts a flow diagram of a method 200 of transmitting uplink data and uplink control signaling from a radio network device to a wireless communication network. Following appropriate configuration, the radio network device transmits uplink data over a specified portion of a full, continuous bandwidth of an uplink carrier (block 202). The radio network device transmits uplink control signaling in at least one control region within the specified portion (block 204). In some embodiments (as indicated by the dashed-line directional arrow and block), the radio network device suppresses the transmission of uplink data in one or more control regions within the specified portion (block 206).

Figure 16:
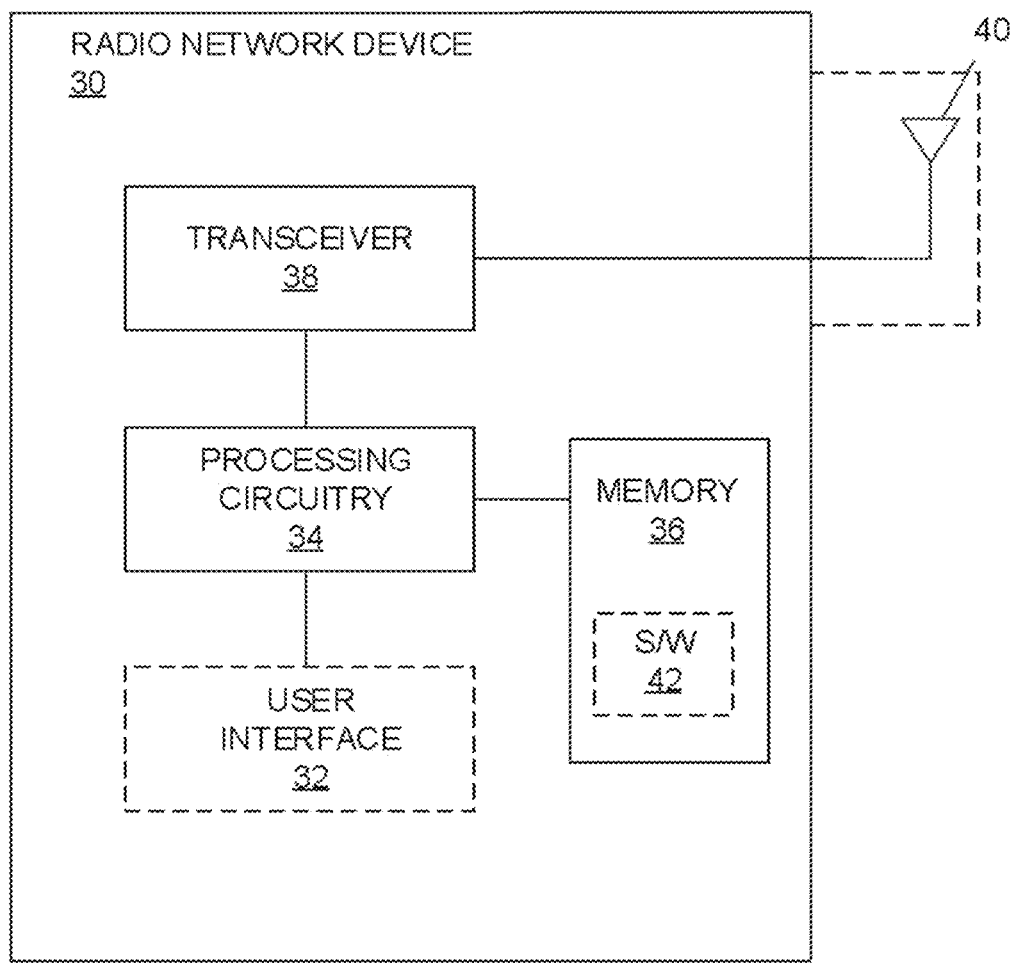
FIG. 16 is a block diagram of a radio network device, such as a UE or NB-IoT device.

FIG. 16 depicts a radio network device 30 operative in embodiments of the present invention. A radio network device 30 is any type device capable of communicating with a base station of a wireless communication network over radio signals. A radio network device 30 may therefore refer to a machine-to-machine (M2M) device, a machine-type communications (MTC) device, a Narrowband Internet of Things (NB-IoT) device, etc. The radio network device may also be a User Equipment (UE); however it should be noted that the UE does not necessarily have a "user" in the sense of an individual person owning and/or operating the device. A radio network device 30 may also be referred to as a radio device, a radio communication device, a wireless communication device, a wireless terminal, or simply a terminal—unless the context indicates otherwise, the use of any of these terms is intended to include device-to-device UEs or devices, machine-type devices or devices capable of machine-to-machine communication, sensors equipped with a radio network device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but may be configured to transmit and/or receive data without direct human interaction.

A radio network device 30 as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

In some embodiments, the radio network device 30 includes a user interface 32 (display, touchscreen, keyboard or keypad, microphone, speaker, and the like); in other embodiments, such as in many M2M, MTC, or NB-IoT scenarios, the radio network device 30 may include only a minimal, or no, user interface 32 (as indicated by the dashed lines of block 32 in FIG. 16). The radio network device 30 also includes processing circuitry 34; memory 36; and radio circuits, such a transceiver 38, one or more antennas 40, and the like, to effect wireless communication across an air interface to one or more radio network nodes 10. As indicated by the dashed lines, the antenna(s) 40 may protrude externally from the radio network device 30, or the antenna(s) 40 may be internal. In some embodiments, the radio network device 30 may additionally include features such as a camera, removable memory interface, short-range communication interface (Wi-Fi, Bluetooth, and the like), wired interface (USB), battery recharge port, and the like (these features are not shown in FIG. 16).

According to embodiments of the present invention, the memory 36 is operative to store, and the processing circuitry 34 operative to execute, software 42 which when executed is operative to cause the radio network device 30 to transmit uplink data over a specified portion of a full, continuous bandwidth of an uplink carrier, and transmit uplink control signaling in at least one control region within the specified portion, as described herein. In particular, the software 42, when executed on the processing circuitry 34, is operative to perform the method 200 described herein. This allows the radio network device 30 to effectively function, including transmitting uplink control signaling in a control region, within the bandwidth of an uplink carrier that may be much broader than the bandwidth the radio network device 30 is capable of or configured to utilize.

Figure 17:
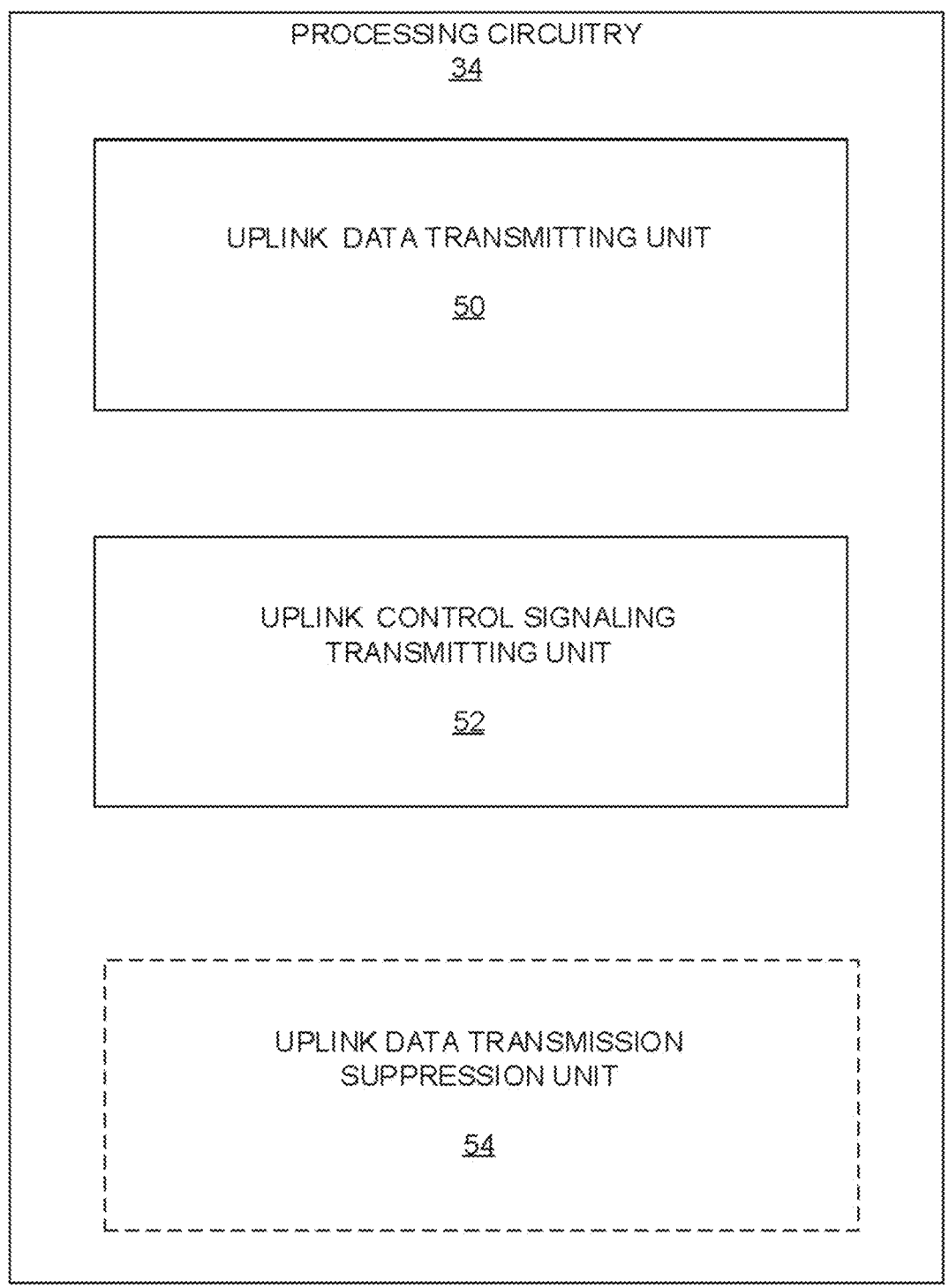
FIG. 17 is a diagram of physical units in processing circuitry in the network radio device of FIG. 16.

FIG. 17 illustrates example processing circuitry 34, such as that in the radio network device 30 of FIG. 16. The processing circuitry 34 comprises a plurality of physical units. In particular, the processing circuitry 34 comprises an uplink data transmitting unit 50, an uplink control signaling transmitting unit 52, and in some embodiments (as indicated by dashed lines), an uplink data transmission suppression unit 54. The uplink data transmitting unit 50 is configured to transmit uplink data over a specified portion of a full, continuous bandwidth of an uplink carrier. The uplink control signaling transmitting unit 52 is configured to transmit uplink control signaling in at least one control region within the specified portion. The uplink data transmission suppression unit 54 is configured to suppress the transmission of uplink data in one or more control regions within the specified portion.

Figure 18:
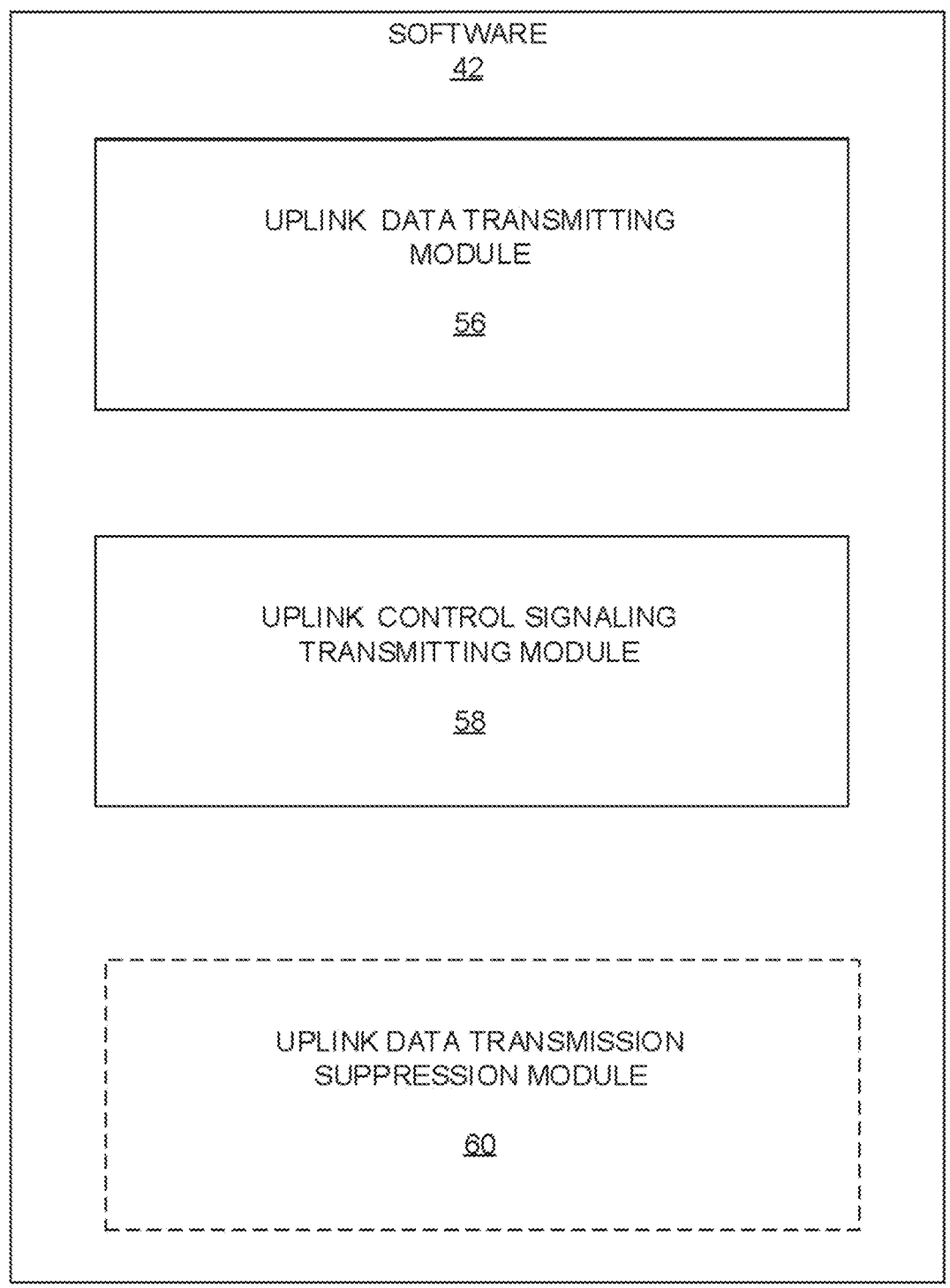
FIG. 18 is a diagram of software modules in memory in the network radio device of FIG. 16.

FIG. 18 illustrates example software 42, such as that depicted in the memory 36 of the radio network device 30 of FIG. 16. The software 42 comprises a plurality of software modules. In particular, the software 42 comprises an uplink data transmitting module 56, an uplink control signaling transmitting module 58, and in some embodiments (as indicated by dashed lines), an uplink data transmission suppression module 60. The uplink data transmitting module 56 is configured to transmit uplink data over a specified portion of a full, continuous bandwidth of an uplink carrier. The uplink control signaling transmitting module 58 is configured to transmit uplink control signaling in at least one control region within the specified portion. The uplink data transmission suppression module 60 is configured to suppress the transmission of uplink data in one or more control regions within the specified portion.

Figure 19:
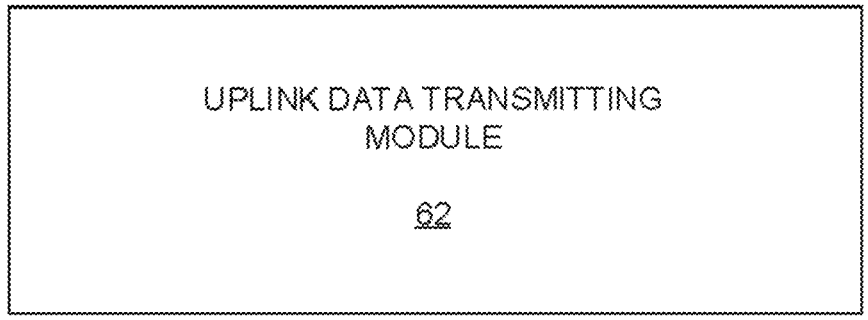
FIG. 19 is a diagram of modules comprising a virtual function module architecture of a radio network device apparatus.
Figure 19:
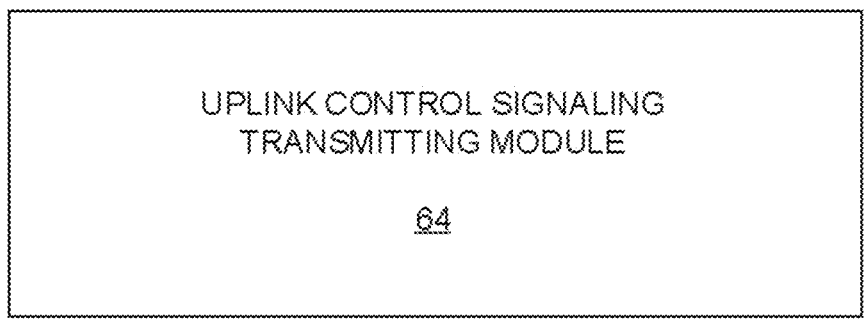
Figure 19:
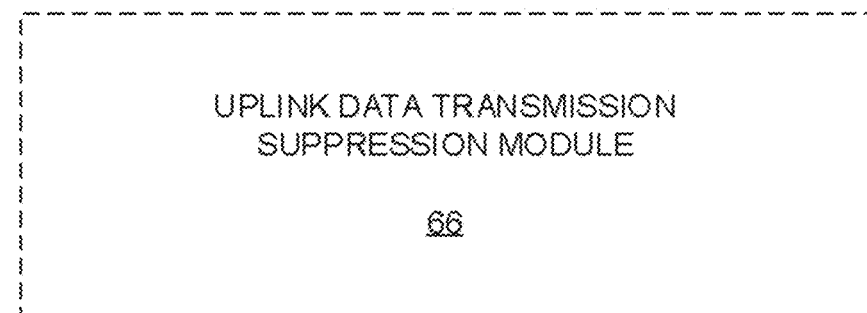

FIG. 19 illustrates a plurality of modules comprising a virtual function module architecture of an apparatus operative as a radio network device in a wireless communication network. A first module 63 is configured to transmit data and control signaling over a specified portion of uplink carrier bandwidth. A second module 64 is configured to transmit control signaling in at least one control region. An optional third module 66 is configured to suppress transmission of uplink data signaling in specified control regions.

In all embodiments, the processing circuitry 14, 34 may comprise any sequential state machine operative to execute machine instructions stored as machine-readable computer programs 22, 42 in memory 16, 36, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

In all embodiments, the memory 16, 36 may comprise any machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like. In some embodiments, the software 22, 42, may be retrieved by the processing circuitry 14, 34 from a carrier which may comprise an electronic signal, optical signal, or radio signal, in addition to, or in lieu of, a computer readable storage medium such as memory 16, 36.

In all embodiments, the radio circuits may comprise one or more transceivers 18, 38 used to communicate with one or more other transceivers via a Radio Access Network (RAN) according to one or more communication protocols known in the art or that may be developed, such as IEEE 802.xx, CDMA, WCDMA, GSM, LTE, UTRAN, WiMax, NB-IoT, NR, or the like. The transceiver 18, 38 implements transmitter and receiver functionality appropriate to the RAN links (e.g., frequency allocations and the like). The transmitter and receiver functions may share circuit components and/or software, or alternatively may be implemented separately.

Those skilled in the art will also appreciate that embodiments herein further include corresponding computer programs. A computer program comprises instructions which, when executed on at least processing circuitry 34 of a radio network device 30, cause the device 30 to carry out any of the respective processing described above, such as the method 200. A computer program in this regard may comprise one or more code modules corresponding to the modules 56, 58, 60 described above.

Embodiments further include a carrier containing such a computer program. This carrier may comprise one of an electronic signal, optical signal, radio signal, or computer readable storage medium 36.

One embodiment relates to a method, implemented by a radio network device operative in a wireless communication network, of transmitting uplink data and uplink control signaling to the network. Uplink data are transmitted over a specified portion of a full, continuous bandwidth of an uplink carrier. Uplink control signaling is transmitted in at least one control region within the specified portion. In some embodiments, the transmission of uplink data is suppressed in one or more control regions within the specified portion.

In one embodiment, the full, continuous bandwidth of the uplink carrier is logically divided into two or more sub-band portions, and at least one sub-band portion includes at least one control region.

In one embodiment, prior to transmitting uplink data or uplink control signaling, information is received, in a System Information message from a base station, regarding the full, continuous bandwidth of the uplink carrier and identifying the sub-band portions.

In one embodiment, a control region within at least one sub-band portion is at the lower or upper extent of the sub-band portion bandwidth.

In one embodiment, control regions within at least one sub-band portion are at both the lower and upper extent of the sub-band portion bandwidth.

In one embodiment, the control regions are at locations derived in a predetermined manner from the carrier bandwidth.

In one embodiment, the specified portion of the full, continuous bandwidth of the uplink carrier is the uplink bandwidth on which the radio network device (30) is capable or configured to transmit.

In one embodiment, prior to transmitting uplink data or uplink control signaling, uplink bandwidth capability of the radio network device is transmitted to the network.

In one embodiment, prior to transmitting uplink data or uplink control signaling, information operative to configure the specified portion of the full, continuous bandwidth of the uplink carrier in the radio network device is received.

In one embodiment, the radio network device (30) is semi-statically configured by the network with information regarding control regions within the specified portion.

In one embodiment, dynamic signaling is received, indicating for which control regions, within the specified portion, the transmission of uplink data signaling should be suppressed.

In one embodiment, indication of transmission suppression for one or more control regions is valid for a predetermined signaling duration.

In one embodiment, the dynamic signaling indicates transmission suppression per control region.

In one embodiment, at least part of at least one control region in the specified portion is reserved for the transmission of device-prompted uplink control signaling.

In one embodiment, transmitting uplink data over a specified portion of a full, continuous bandwidth of an uplink carrier comprises subtracting from the specified portion, at least part of a control region within the specified portion, yielding a reduced specified portion of the full, continuous bandwidth of the uplink carrier; and transmitting uplink data over the reduced specified portion of the full, continuous bandwidth of the uplink carrier.

Another embodiment relates to a radio network device operative in a wireless communication network. The device includes one or more antennas and a transceiver operatively connected to the antennas. The device also includes processing circuitry operatively connected to the transceiver. The processing circuitry is operative to cause the transceiver to transmit uplink data over a specified portion of a full, continuous bandwidth of an uplink carrier; and transmit uplink control signaling in at least one control region within the specified portion. In some embodiments, the processing circuitry is further operative to suppress the transmission of uplink data in one or more control regions within the specified portion.

In another embodiment, the full, continuous bandwidth of the uplink carrier is logically divided into two or more sub-band portions, and wherein each sub-band portion includes at least one control region.

In another embodiment, the processing circuitry is further operative to cause the transceiver to receive information regarding the full, continuous bandwidth of the uplink carrier and identifying the sub-band portions in a System Information broadcast from a base station.

In another embodiment, a control region within at least one sub-band portion is at the lower or upper extent of the sub-band portion bandwidth.

In another embodiment, control regions within at least one sub-band portion are at both the lower and upper extent of the sub-band portion bandwidth.

In another embodiment, the control regions are at locations derived in a predetermined manner from the carrier bandwidth.

In another embodiment, the specified portion of the full, continuous bandwidth of the uplink carrier is the uplink bandwidth on which the radio network device is capable or configured to transmit.

In another embodiment, the processing circuitry is further operative to cause the transceiver to transmit uplink bandwidth capability of the radio network device to the network prior to transmitting uplink data or uplink control signaling.

In another embodiment, the processing circuitry is further operative to cause the transceiver to receive information operative to configure the specified portion of the full, continuous bandwidth of the uplink carrier in the radio network device prior to transmitting uplink data or uplink control signaling.

In another embodiment, the radio network device is semi-statically configured by the network with information regarding control regions within the specified portion.

In another embodiment, the processing circuitry is further operative to cause the transceiver to receive dynamic signaling indicating for which control regions, within the specified portion, the transmission of uplink data signaling should be suppressed.

In another embodiment, the indication of transmission suppression for one or more control regions is valid for a predetermined signaling duration.

In another embodiment, the dynamic signaling indicates transmission suppression per control region.

In another embodiment, at least part of at least one control region in the specified portion is reserved for the transmission of device-prompted uplink control signaling.

In another embodiment, the processing circuitry is further operative to transmit uplink data over a specified portion of a full, continuous bandwidth of an uplink carrier by subtracting from the specified portion, at least part of a control region within the specified portion, yielding a reduced specified portion of the full, continuous bandwidth of the uplink carrier; and transmitting uplink data over the reduced specified portion of the full, continuous bandwidth of the uplink carrier.

Yet another embodiment relates to an apparatus operative in a wireless communication network. The apparatus includes a first module operative to transmit uplink data over a specified portion of a full, continuous bandwidth of an uplink carrier. The apparatus also includes a second module operative to transmit uplink control signaling in at least one control region within the specified portion. The apparatus optionally further includes a third module operative to suppress the transmission of uplink data in one or more control regions within the specified portion.

Still another embodiment relates to a computer program comprising instructions which, when executed by processing circuitry of a radio network device operative in a wireless communication network, causes the device to carry out the method of transmitting uplink data and uplink control signaling to the network described above. Another embodiment relates to a carrier containing the computer program, wherein the carrier is one of an electronic signal, optical signal, radio signal, or computer readable storage medium.

One embodiment relates to a method, implemented by a radio network node operative in a wireless communication network, of receiving uplink data and uplink control signaling from a radio network device. Uplink data are received from a radio network device over a specified portion of a full, continuous bandwidth of an uplink carrier. Uplink control signaling is received from the radio network device in at least one control region within the specified portion.

In one embodiment, the full, continuous bandwidth of the uplink carrier is logically divided into two or more sub-band portions, and wherein at least one sub-band portion includes at least one control region.

In one embodiment, prior to receiving uplink data or uplink control signaling, information regarding the full, continuous bandwidth of the uplink carrier and identifying the sub-band portions is transmitted in a System Information message.

In one embodiment, a control region within at least one sub-band portion is at the lower or upper extent of the sub-band portion bandwidth.

In one embodiment, control regions within at least one sub-band portion are at both the lower and upper extent of the sub-band portion bandwidth.

In one embodiment, the control regions are at locations derived in a predetermined manner from the carrier bandwidth.

In one embodiment, the specified portion of the full, continuous bandwidth of the uplink carrier is the uplink bandwidth on which the radio network device is capable or configured to transmit.

In one embodiment, prior to receiving uplink data or uplink control signaling, uplink bandwidth capability of the radio network device is received.

In one embodiment, prior to receiving uplink data or uplink control signaling, information operative to configure the specified portion of the full, continuous bandwidth of the uplink carrier is transmitted to the radio network device.

In one embodiment, dynamic signaling is transmitted to the radio network device indicating for which control regions, within the specified portion, the transmission of uplink data signaling should be suppressed.

In one embodiment, the indication of uplink transmission suppression for one or more control regions is valid for a predetermined signaling duration.

In one embodiment, the dynamic signaling indicates uplink transmission suppression per control region.

In one embodiment, at least part of at least one control region in the specified portion is reserved for the receipt of device-prompted uplink control signaling.

In one embodiment, receiving uplink data from a radio network device over a specified portion of a full, continuous bandwidth of an uplink carrier comprises receiving uplink data over a reduced specified portion of the full, continuous bandwidth of the uplink carrier; wherein the reduced specified portion is determined by a radio network device subtracting from the specified portion of the full, continuous bandwidth of an uplink carrier, at least part of a control region within the specified portion, yielding the reduced specified portion of the full, continuous bandwidth of the uplink carrier.

Another embodiment relates to a radio network node operative in a wireless communication network. The device includes one or more antennas and a transceiver operatively connected to the antennas. The device also includes processing circuitry operatively connected to the transceiver. The processing circuitry is operative to cause the transceiver to receive uplink data from a radio network device over a specified portion of a full, continuous bandwidth of an uplink carrier; and receive uplink control signaling from the radio network device in at least one control region within the specified portion.

In another embodiment, the full, continuous bandwidth of the uplink carrier is logically divided into two or more sub-band portions, and wherein each sub-band portion includes at least one control region.

In another embodiment, the processing circuitry is further operative to cause the transceiver to transmit information regarding the full, continuous bandwidth of the uplink carrier and identifying the sub-band portions in a System Information broadcast.

In another embodiment, a control region within at least one sub-band portion is at the lower or upper extent of the sub-band portion bandwidth.

In another embodiment, control regions within at least one sub-band portion are at both the lower and upper extent of the sub-band portion bandwidth.

In another embodiment, the control regions are at locations derived in a predetermined manner from the carrier bandwidth.

In another embodiment, the specified portion of the full, continuous bandwidth of the uplink carrier is the uplink bandwidth on which the radio network device is capable or configured to transmit.

In another embodiment, the processing circuitry is further operative to cause the transceiver to receive uplink bandwidth capability of the radio network device prior to receiving uplink data or uplink control signaling.

In another embodiment, the processing circuitry is further operative to cause the transceiver to transmit information operative to configure the specified portion of the full, continuous bandwidth of the uplink carrier in the radio network device prior to receiving uplink data or uplink control signaling.

In another embodiment, the processing circuitry is further operative to cause the transceiver to transmit signaling to the radio network device operative to semi-statically configure control regions within the specified portion.

In another embodiment, the processing circuitry is further operative to cause the transceiver to transmit dynamic signaling indicating for which control regions, within the specified portion, the transmission of uplink data signaling should be suppressed.

In another embodiment, the indication of transmission suppression for one or more control regions is valid for a predetermined signaling duration.

In another embodiment, the dynamic signaling indicates transmission suppression per control region.

In another embodiment, at least part of at least one control region in the specified portion is reserved for the transmission of device-prompted uplink control signaling.

In another embodiment, the processing circuitry is further operative to cause the transceiver to receive uplink data from a radio network device over a specified portion of a full, continuous bandwidth of an uplink carrier by receiving uplink data over a reduced specified portion of the full, continuous bandwidth of the uplink carrier; wherein the reduced specified portion is determined by a radio network device subtracting from the specified portion of the full, continuous bandwidth of an uplink carrier, at least part of a control region within the specified portion, yielding the reduced specified portion of the full, continuous bandwidth of the uplink carrier.

Yet another embodiment relates to an apparatus operative in a wireless communication network. The apparatus includes a first module operative to receive uplink data from a radio network device over a specified portion of a full, continuous bandwidth of an uplink carrier. The apparatus also includes a second module operative to receive uplink control signaling from the radio network device in at least one control region within the specified portion.

Still another embodiment relates to a computer program comprising instructions which, when executed by processing circuitry of a radio network node operative in a wireless communication network, causes the device to carry out the method of receiving uplink data and uplink control signaling from a radio network device described above. Another embodiment relates to a carrier containing the computer program, wherein the carrier is one of an electronic signal, optical signal, radio signal, or computer readable storage medium.

The above descriptions and figures depict the network defining control regions in various portions of the uplink carrier bandwidth, and assigning uplink resources to radio network devices based on their capability and/or configuration. Those of skill in the art will readily realize that, while the network could partition or define the uplink carrier bandwidth according any of FIGS. 4-8, and assign resources to all radio network devices based on one or more of these partitions, there is no reason that all requesting radio network devices must be assigned resources based on the same (one or more) predefined partitions. That is, the network may assign portions of an available uplink carrier bandwidth, and define control regions within the portions, on an ad hoc basis, whereby each radio network device (or group, or class, of similar radio network devices) is independently assigned such a portion. The signaling between the base station and radio network device would proceed as described herein, with the actual partitioning of the uplink carrier bandwidth and definition of control regions therein, being determined on a per-device (or per-group or per-class) basis, rather than one or a few such partitions being applied to all requesting radio network devices.

Embodiments of the present invention present numerous advantages over the prior art. Embodiments of the invention enable a network to simultaneously accommodate radio network devices that have, or are configured to use, different uplink transmission bandwidths within an uplink carrier having a bandwidth that is wider than the transmission bandwidth of some or all of the radio network devices. Embodiments described herein ensure efficient use of uplink resources in a dynamic fashion, so that control regions can be used for data transmission whenever no other radio network device is transmitting control signaling in those control regions. Embodiments also enable frequency diversity gains for radio network devices configured with multiple control regions within their specified portion of the uplink carrier bandwidth. Whenever a radio network device is not required to suppress data transmission over a control region within its specified portion of the uplink carrier bandwidth, the radio network device may transmit data signaling contiguously over a larger spectrum. the radio network device may thus achieve better PAPR and lower out-of-band emissions, compared to a system in which the control region must always be protected from data transmission, which results in non-contiguous data transmissions for radio network devices transmitting over multiple sub-band portions. The PAPR reduction is particularly advantageous for radio network devices transmitting DFTS-OFDM.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, implemented by a radio network device operative in a wireless communication network, of transmitting uplink data and uplink control signaling to the network, the method characterized by:

being allocated, by the network, a specified portion of a full, continuous bandwidth of an uplink carrier for transmitting uplink data;

receiving, from the network, identification of one or more control regions within the specified portion that are reserved for control signaling by other radio network devices; and in response to an indication from the network, selectively transmitting uplink data, or suppressing transmission of uplink data, on resources within the one or more control regions within the specified portion.

2. The method of claim 1, wherein the full, continuous bandwidth of the uplink carrier is logically divided into two or more sub-band portions, and wherein at least one sub-band portion includes at least one control region; and the radio network device is provisioned with, or receives from the network, information regarding the full, continuous bandwidth of the uplink carrier.

3. The method of claim 2, further characterized by determining the sub-band portions and one or more control regions within the full, continuous bandwidth of the uplink carrier by a predetermined relationship with the carrier bandwidth.

4. The method of claim 2, further characterized by receiving from the network information identifying sub-band portions and one or more control regions within the full, continuous bandwidth of the uplink carrier.

5. The method of claim 4, wherein receiving from the network information identifying sub-band portions and one or more control regions within the full, continuous bandwidth of the uplink carrier comprises receiving the information in a System Information broadcast.

6. The method of claim 4, wherein receiving from the network information identifying sub-band portions and one or more control regions within the full, continuous bandwidth of the uplink carrier comprises receiving the information in higher layer signaling directed to the radio network device.

7. The method of claim 1, wherein the indication from the network to transmit or suppress uplink data on resources within the one or more control regions is received in downlink control signaling.

8. The method of claim 1, wherein the indication from the network to transmit or suppress uplink data on resources within the one or more control regions applies to one of a single control region, a pre-defined group of control regions, and all control regions.

9. The method of claim 1, wherein the indication from the network to transmit or suppress uplink data on resources within the one or more control regions applies to a specified subset of the one or more control regions.

10. The method of claim 1, further characterized by transmitting uplink bandwidth capability and/or configuration of the radio network device to the network.

11. A radio network device operative in a wireless communication network, comprising:
one or more antennas;
a transceiver operatively connected to the antennas; and
processing circuitry operatively connected to the transceiver, and configured to:
be allocated, by the network, a specified portion of a full, continuous bandwidth of an uplink carrier for transmitting uplink data;
receive, from the network, identification of one or more control regions within the specified portion that are reserved for control signaling by other radio network devices; and
in response to an indication from the network, selectively transmit uplink data, or suppress transmission of uplink data, on resources within the one or more control regions within the specified portion.

12. The radio network device of claim 11, wherein
the full, continuous bandwidth of the uplink carrier is logically divided into two or more sub-band portions, and wherein at least one sub-band portion includes at least one control region; and
the radio network device is provisioned with, or receives from the network, information regarding the full, continuous bandwidth of the uplink carrier.

13. The radio network device of claim 12, wherein the processing circuitry is further configured to determine the sub-band portions and one or more control regions within the full, continuous bandwidth of the uplink carrier by a predetermined relationship with the carrier bandwidth.

14. The radio network device of claim 12, wherein the processing circuitry is further configured to receive from the network information identifying sub-band portions and one or more control regions within the full, continuous bandwidth of the uplink carrier.

15. The radio network device of claim 14, wherein the processing circuitry is configured to receive from the network information identifying sub-band portions and one or more control regions within the full, continuous bandwidth of the uplink carrier by receiving the information in a System Information broadcast.

16. The radio network device of claim 14, wherein the processing circuitry is configured to receive from the network information identifying sub-band portions and one or more control regions within the full, continuous bandwidth of the uplink carrier by receiving the information in higher layer signaling directed to the radio network device.

17. The radio network device of claim 11, wherein the indication from the network to transmit or suppress uplink data on resources within the one or more control regions is received in downlink control signaling.

18. The radio network device of claim 11, wherein the indication from the network to transmit or suppress uplink data on resources within the one or more control regions applies to one of a single control region, a pre-defined group of control regions, and all control regions.

19. The radio network device of claim 11, wherein the indication from the network to transmit or suppress uplink data on resources within the one or more control regions applies to a specified subset of the one or more control regions.

20. The radio network device of claim 11, wherein the processing circuitry is further configured to transmit uplink bandwidth capability and/or configuration of the radio network device to the network.

21. A non-transitory computer readable medium comprising program instructions which, when executed by processing circuitry of a radio network device operative in a wireless communication network, cause the device to perform the steps of:
being allocated, by the network, a specified portion of a full, continuous bandwidth of an uplink carrier for transmitting uplink data;
receiving, from the network, identification of one or more control regions within the specified portion that are reserved for control signaling by other radio network devices; and
in response to an indication from the network, selectively transmitting uplink data, or suppressing transmission of uplink data, on resources within the one or more control regions within the specified portion.

22. A method, implemented by a radio network device operative in a wireless communication network, of receiving uplink data and uplink control signaling from a radio network device, the method characterized by:
allocating to the radio network device a specified portion of a full, continuous bandwidth of an uplink carrier for transmitting uplink data;
transmitting to the radio network device identification of one or more control regions within the specified portion that are reserved for control signaling by other radio network devices; and
transmitting to the radio network device an indication that the radio network device selectively transmit uplink data, or suppress transmission of uplink data, on resources within the one or more control regions within the specified portion.

23. The method of claim 22,
wherein the full, continuous bandwidth of the uplink carrier is logically divided into two or more sub-band portions, and wherein at least one sub-band portion includes at least one control region; and further characterized by
transmitting to the radio network device information regarding the full, continuous bandwidth of the uplink carrier.

24. The method of claim 23, wherein the radio network device determines the sub-band portions and one or more control regions within the full, continuous bandwidth of the uplink carrier by a predetermined relationship with the carrier bandwidth.

25. The method of claim 23, further characterized by transmitting to the radio network device information identifying sub-band portions and one or more control regions within the full, continuous bandwidth of the uplink carrier.

26. The method of claim 25, wherein transmitting to the radio network device information identifying sub-band portions and one or more control regions within the full, continuous bandwidth of the uplink carrier comprises transmitting the information in a System Information broadcast.

27. The method of claim 25, wherein transmitting to the radio network device information identifying sub-band portions and one or more control regions within the full, continuous bandwidth of the uplink carrier comprises transmitting the information in higher layer signaling directed to the radio network device.

28. The method of claim 22, wherein transmitting to the radio network device the indication to transmit or suppress uplink data on resources within the one or more control regions comprises transmitting the indication in downlink control signaling.

29. The method of claim 22, wherein the indication to transmit or suppress uplink data on resources within the one or more control regions applies to one of a single control region, a pre-defined group of control regions, and all control regions.

30. The method of claim 22, wherein the indication to transmit or suppress uplink data on resources within the one or more control regions applies to a specified subset of the one or more control regions.

31. The method of claim 22, further characterized by receiving from the radio network device uplink bandwidth capability and/or configuration of the radio network device.

32. A radio network node operative in a wireless communication network, comprising:
  one or more antennas;
  a transceiver operatively connected to the antennas; and
  processing circuitry operatively connected to the transceiver, and configured to:
    allocate to a radio network device a specified portion of a full, continuous bandwidth of an uplink carrier for transmitting uplink data;
    transmit to the radio network device identification of one or more control regions within the specified portion that are reserved for control signaling by other radio network devices; and
    transmit to the radio network device an indication that the radio network device selectively transmit uplink data, or suppress transmission of uplink data, on resources within the one or more control regions within the specified portion.

33. The radio network node of claim 32, wherein
  the full, continuous bandwidth of the uplink carrier is logically divided into two or more sub-band portions, and wherein at least one sub-band portion includes at least one control region; and
  the processing circuitry is further configured to transmit to the radio network device information regarding the full, continuous bandwidth of the uplink carrier.

34. The radio network node of claim 33, wherein the radio network device determines the sub-band portions and one or more control regions within the full, continuous bandwidth of the uplink carrier by a predetermined relationship with the carrier bandwidth.

35. The radio network node of claim 33, wherein the processing circuitry is further configured to transmit to the radio network device information identifying sub-band portions and one or more control regions within the full, continuous bandwidth of the uplink carrier.

36. The radio network node of claim 35, wherein the processing circuitry is configured to transmit to the radio network device information identifying sub-band portions and one or more control regions within the full, continuous bandwidth of the uplink carrier by transmitting the information in a System Information broadcast.

37. The radio network node of claim 35, wherein the processing circuitry is configured to transmit to the radio network device information identifying sub-band portions and one or more control regions within the full, continuous bandwidth of the uplink carrier by transmitting the information in higher layer signaling directed to the radio network device.

38. The radio network node of claim 32, wherein the processing circuitry is configured to transmit to the radio network device the indication to transmit or suppress uplink data on resources within the one or more control regions by transmitting the indication in downlink control signaling.

39. The radio network node of claim 32, wherein the indication to transmit or suppress uplink data on resources within the one or more control regions applies to one of a single control region, a pre-defined group of control regions, and all control regions.

40. The radio network node of claim 32, wherein the indication to transmit or suppress uplink data on resources within the one or more control regions applies to a specified subset of the one or more control regions.

41. The radio network node of claim 32, wherein the processing circuitry is further configured to receive from the radio network device uplink bandwidth capability and/or configuration of the radio network device.

42. A non-transitory computer readable medium comprising program instructions which, when executed by processing circuitry of a radio network node operative in a wireless communication network, causes the node to perform the steps of:
  allocating to a radio network device a specified portion of a full, continuous bandwidth of an uplink carrier for transmitting uplink data;
  transmitting to the radio network device identification of one or more control regions within the specified portion that are reserved for control signaling by other radio network devices; and
  transmitting to the radio network device an indication that the radio network device selectively transmit uplink data, or suppress transmission of uplink data, on resources within the one or more control regions within the specified portion.

* * * * *